(12) United States Patent
McCosh

(10) Patent No.: US 8,142,634 B2
(45) Date of Patent: *Mar. 27, 2012

(54) METHOD AND APPARATUS FOR ELECTROPHORETIC SEPARATION OF SOLIDS AND WATER FROM OIL BASED MUD

(75) Inventor: Karen McCosh, Aberdeen (GB)

(73) Assignee: M-I L.L.C., Houston, TX (US)

( * ) Notice: Subject to any disclaimer, the term of this patent is extended or adjusted under 35 U.S.C. 154(b) by 970 days.

This patent is subject to a terminal disclaimer.

(21) Appl. No.: 12/043,011

(22) Filed: Mar. 5, 2008

(65) Prior Publication Data

US 2008/0217065 A1 Sep. 11, 2008

Related U.S. Application Data

(60) Provisional application No. 60/981,000, filed on Oct. 18, 2007, provisional application No. 60/894,113, filed on Mar. 9, 2007.

(51) Int. Cl.
*B03C 5/00* (2006.01)
*B01D 57/02* (2006.01)
*B03C 5/02* (2006.01)

(52) U.S. Cl. ..................................... 204/553

(58) Field of Classification Search .................. 204/553, 204/571, 648, 649, 650, 669, 573
See application file for complete search history.

(56) References Cited

U.S. PATENT DOCUMENTS

| | | | |
|---|---|---|---|
| 2,031,210 A * | 2/1936 | Dillon et al. | 204/669 |
| 2,109,131 A | 2/1938 | Fisher | |
| 2,440,504 A | 4/1948 | Fisher et al. | |
| 3,415,735 A | 12/1968 | Brown et al. | |
| 3,799,857 A | 3/1974 | Franse | |

(Continued)

FOREIGN PATENT DOCUMENTS

WO 9530726 11/1995

(Continued)

OTHER PUBLICATIONS

PCT Written Opinion issued in Application No. PCT/US2008/056055 dated Aug. 14, 2008 (6 pages).

(Continued)

*Primary Examiner* — Keith Hendricks
*Assistant Examiner* — Steven A. Friday
(74) *Attorney, Agent, or Firm* — Osha Liang LLP

(57) ABSTRACT

A method of treating an invert emulsion drilling fluid, the method including pumping the drilling fluid to an electrophoresis unit that includes a positively charged electrode and a negatively charged electrode, applying a voltage between 200 V and 5000 V across the two electrodes to deposit water and solids on one of the charged electrodes, and removing deposited solids and water from the collection electrode is disclosed. An apparatus for treating an invert emulsion drilling fluid, the apparatus including a bath, a drum disposed in the bath, a power supply capable of applying a voltage between the housing and the drum in the range of 200 V to 5000 V, a motor coupled to the drum to rotate the drum at a predetermined speed, and a scraper having a first position in which the scraper contacts the rotating drum to remove deposited solids and water and a second position in which the scraper is retained away from the drum is also disclosed.

14 Claims, 31 Drawing Sheets

U.S. PATENT DOCUMENTS

| | | | |
|---|---|---|---|
| 3,825,484 | A | 7/1974 | Fronsman et al. |
| 3,928,158 | A | 12/1975 | Fritsche et al. |
| 3,972,799 | A * | 8/1976 | Taylor et al. .................. 204/649 |
| 3,980,547 | A | 9/1976 | Kunkle |
| 3,981,789 | A | 9/1976 | Harrison et al. |
| 4,048,038 | A | 9/1977 | Kunkle |
| 4,134,820 | A | 1/1979 | Ellis et al. |
| 4,170,529 | A | 10/1979 | Freeman |
| 4,269,681 | A | 5/1981 | Watson et al. |
| 4,305,797 | A | 12/1981 | Knoll et al. |
| 4,444,637 | A | 4/1984 | King |
| 4,551,217 | A | 11/1985 | King |
| 4,910,634 | A * | 3/1990 | Pipkorn ..................... 200/61.62 |
| 5,399,249 | A | 3/1995 | Scheufler et al. |
| 7,686,933 | B2 * | 3/2010 | Browne et al. ................ 204/669 |
| 2006/0016688 | A1 | 1/2006 | Carrier et al. |
| 2006/0131247 | A1 | 6/2006 | Browne et al. |
| 2007/0235336 | A1 | 10/2007 | Carrier et al. |
| 2008/0056055 | A1 | 3/2008 | Uetake |

FOREIGN PATENT DOCUMENTS

| | | |
|---|---|---|
| WO | WO 2005/017307 A1 * | 2/2005 |

OTHER PUBLICATIONS

PCT International Preliminary Report on Patentability issued in International Application No. PCT/GB04/002863 dated Feb. 13, 2006 (7 pages).

PCT International Search Report issued in Application No. PCT/US2005/45720 dated Feb. 9, 2007 (2 pages).

PCT Written Opinion issued in Application No. PCT/US2005/45720 dated Feb. 9, 2007 (3 pages).

PCT International Search Report issued in Application No. PCT/US2008/056055 dated Aug. 14, 2008 (3 pages).

Official Action issued in corresponding Canadian Patent Application No. 2,680,267; Dated Jan. 24, 2011 (2 pages).

Official Action issued in corresponding Mexican Patent Application No. MX/a/2009/009509 with English reporting letter; Dated May 31, 2011 (4 pages).

Official Action issued in corresponding Mexican Application No. MX/a/2009/009509; Dated Oct. 19, 2011 (6 pages).

* cited by examiner

METHOD AND APPARATUS FOR ELECTROPHORETIC SEPARATION OF SOLIDS AND WATER FROM OIL BASED MUD

CROSS-REFERENCE TO RELATED APPLICATION

This application claims priority, under 35 U.S.C. §119(e), to U.S. Provisional Application Ser. No. 60/894,113, filed Mar. 9, 2007, and U.S. Provisional Application Ser. No. 60/981,000, filed Oct. 18, 2007, the disclosures of which are hereby incorporated by reference in their entireties.

BACKGROUND OF INVENTION

1. Field of the Invention

Embodiments disclosed herein relate to methods and apparatus for treating drilling fluids. More specifically, embodiments disclosed herein relate to methods and apparatus for separating particulate solids and water from an invert emulsion drilling fluid.

2. Background Art

When drilling oil and/or gas wells, oil-based drilling fluids are often used to cool the drill bit, remove rock chips, and control subsurface fluids. After used, this fluid, known as drilling mud, contains undesirable solids. Before the mud can be used again, the solids must be removed.

Various devices are used to remove solids from drilling fluid. Large solids are often removed by passing the fluid through a vibrating porous membrane, or screen, thereby segregating the solids that are too large to pass through the screen. A centrifugal force may be applied to the fluid to remove finer solids from the drilling mud. However, ultra fine solids, i.e., those solids that are not removed from the fluid by mechanical means, such as vibratory separators and centrifuges, remain in the oil-based mud even after such processing. Additionally, continual re-use of the drilling fluid increases the amount of ultra fine solid contaminants present in the fluid.

Ultra fine solids may affect many fluid system properties adversely. Formation clays are unavoidably incorporated into the fluid system, and, depending on their nature and amount, the clay minerals may be beneficial or harmful to the fluid system. Contaminants, such as gypsum, can "cut" the fluid system causing particles to flocculate and the viscosity to increase. When this occurs, there is danger of torquing the drill pipe to the point of breakage or danger of causing a blowout. At high temperatures, gelation or thickening of the fluid may occur, leading to increased pressure on the recirculation pump.

As drilling fluids are used to drill multiple wells, fine low gravity solids (LGS) (i.e., solids less than 5 μm) build up, because they cannot be removed by separation equipment (e.g., shakers, decanting centrifuges, etc.). Traditionally, drilling fluids are diluted to reduce the LGS concentration and reformulated back to the required properties. This is often costly and also increases the volume of drilling fluid, which leads to storage, transportation and disposal issues. In severe cases, the whole volume of mud is disposed and a fresh fluid is mixed, at significant cost. The environmental impact of continuously disposing large volumes of fluid must be addressed and disposal volumes reduced.

In addition to LGS, water and other liquids (liquid chemicals and brine droplets) also become entrained in the drilling fluid, and cannot be removed by standard separation equipment (e.g., shakers, decanting centrifuges, etc.). Traditionally, drilling fluids are diluted to reduce the water concentration of the invert emulsion drilling fluid. For example, oil may be added to the drilling fluid, such that the oil/water ratio is consistent with the desired needs of the invert emulsion fluid for a particular application or drilling operation. This is often costly and also increases the volume of drilling fluid, which leads to storage, transportation and disposal issues.

Accordingly, there exists a need for improved methods and apparatus for invert emulsion drilling fluid recycling. Additionally, there exists a need for improved methods for removing ultra fine solids and water from drilling fluids that increase the effective fluid lifespan and reduce the need for dilution and disposal of the fluid.

SUMMARY OF INVENTION

In one aspect, embodiments disclosed herein relate to a method of treating an invert emulsion drilling fluid, the method including pumping the drilling fluid to an electrophoresis unit that includes a positively charged electrode and a negatively charged electrode, applying a voltage between 200 V and 5000 V across the two electrodes to deposit water and solids on the negatively charged electrode, and removing deposited solids and water from the negatively charged electrode.

In another aspect, embodiments disclosed herein relate to an apparatus for treating an invert emulsion drilling fluid, the apparatus including a bath, a drum disposed in the bath, a power supply capable of applying a voltage between the housing and the drum in the range of 200 V to 5000 V, a motor coupled to the drum to rotate the drum at a predetermined speed, and a scraper having a first position in which the scraper contacts the rotating drum to remove deposited solids and water and a second position in which the scraper is retained away from the drum.

In yet another aspect, embodiments disclosed herein relate to a method of treating an invert emulsion drilling fluid, the method including pumping the drilling fluid to an electrophoresis unit including a positively charged electrode and a negatively charged electrode, applying a voltage between 200 V and 5000 V across the two electrodes to deposit water and solids on the positively charged electrode, and removing deposited solids and water from the positively charged electrode.

Other aspects and advantages of the invention will be apparent from the following description and the appended claims.

DETAILED DESCRIPTION

Figure 1A:
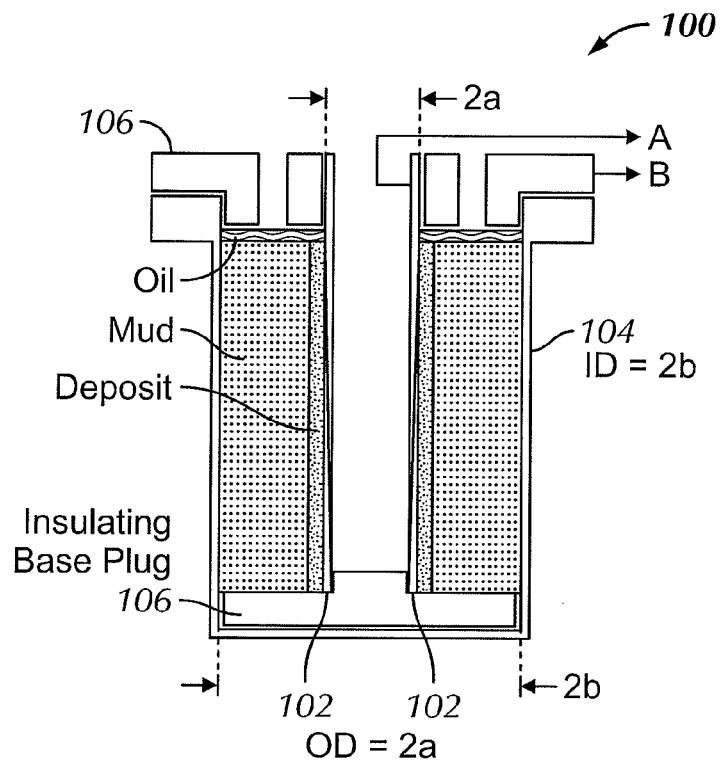
FIG. 1A shows a cross-sectional view of a laboratory test cell for treating a drilling fluid in accordance with embodiments disclosed herein.

Reference is made to co-pending U.S. application Ser. Nos. 10/517,332, filed on Jul. 2, 2004, 11/008,009, filed on Dec. 9, 2004, 11/303,111, filed on Dec. 16, 2005, and 60/894,113 filed on Mar. 9, 2007, all of which are incorporated herein by reference.

In one aspect, embodiments disclosed herein relate to a method for treating drilling fluids. More specifically, embodiments disclosed herein relate to a method for treating an invert emulsion drilling fluid. In particular, embodiments disclosed herein relate to a method of separating particulate solids and liquids (e.g., water, brine) from an invert emulsion drilling fluid.

In one embodiment, a method of separating and/or removing particulate solids and liquids from an oil based drilling or completion fluid is disclosed. In this embodiment, the method includes exposing the drilling fluid to an electric field to electrically migrate particulate solids and liquids suspended therein, and collecting the migrated particulate solids and liquids to remove them from the fluid.

In another aspect, embodiments disclosed herein relate to apparatus for treating drilling fluids. More specifically, embodiments disclosed herein relate to apparatus for treating an invert emulsion drilling fluid. In certain embodiments disclosed herein, an apparatus for treating invert emulsion drilling fluids provides continual ultra fine solids removal capability to a stream of such contaminated fluid. Such an apparatus may be used in series with other treatment apparatuses to remove contaminants from a stream of drilling fluid. In other embodiments, an apparatus for treating invert emulsion drilling fluids provides removal of ultra fine solids from a batch or store of drilling fluid.

As used herein, invert emulsion drilling fluids are stable water-in-oil emulsions containing viscosifiers, weighting agents, and other additives. Solids control equipment at the rig site removes the majority of the drilled solids entrained in the fluid during the drilling process. However, the build up of fine material along with water ingress from the formation may eventually affect the fluid's chemical and physical properties to such an extent that dilution or disposal is necessary. Methods and apparatus disclosed herein may be used to remove the fine particles and water from the drilling fluid.

Electrophoresis may be used to remove ultra fine solid contaminants and water from oil-based (i.e., invert) drilling fluid so that additional use of the drilling fluid is possible, such that dilution or disposal of the drilling fluid is not necessary. Electrophoresis is defined as the motion of charged molecules or particles in a liquid medium under the influence of an electric field; particles with a positive charge migrate to the cathode and particles with a negative charge migrate to the anode. This process may be used to purify certain drilling fluids.

The force F on a charged particle in an external electric field is proportional to the charge q of the particles and the electric field strength E. This can be represented as $$F=qE \quad (1)$$

If q is measured in Coulomb (C) and E is in volt meter$^{-1}$, F will be given in Newtons. However, the true particle velocity also depends on particle properties (e.g., surface charge density and size) and on the properties of the solution through which it travels (e.g., frictional forces, viscosity, etc.). As the charged species migrate they concentrate and form a deposit at one of the electrodes. The charge of the electrode (i.e., positive or negative) will determine the species of particle that forms the deposit. The quantity of deposit formed will not only depend on the migration rate and direction, but also on electrode geometry, area, collection time and temperature.

In one embodiment, an electrophoresis unit may be used to separate particulate solids and water from an oil based drilling fluid. In this embodiment, the drilling fluid is placed in the electrophoresis unit and an electric field is applied to the oil based drilling fluid, such that particulate solids and water are repelled from an electrode. Alternatively, an electric field may be applied to the oil based drilling fluid such that particulate solids and water are attracted to the electrode. Particulate solids affected by the electric field may include colloidal particles and ultra fine solid particles, as well as other solids and chemicals. For example, particulate solids may include clays, barite, and other weighting agents. In one embodiment, liquids may also be repelled from or attracted to an electrode. As used herein, liquids may refer to, for example, water, liquid chemicals, and brine droplets.

In certain embodiments, the electric field is substantially uniform. However, in other embodiments the electric field is spatially non-uniform. One effect of non-uniform fields is well-known as dielectrophoresis, whereby the field induces an electric dipole moment in an uncharged particle of different electrical permittivity from the surrounding liquid. The particle is then caused, by the field gradient, to migrate towards the high-field region where it may be collected. An advantage of a non-uniform field is, therefore, that the migrating particles are not required to possess an electrical charge.

Embodiments disclosed herein may also include a deposit removal system that may collect deposits from a location proximate the electrodes and/or actively remove deposits from the surface of the electrodes. The removal system may be operated continuously or as a batch process. In the latter case, it is preferred to operate the removal system during periods in which the electric field is switched off.

In certain embodiments, the voltage applied to the drilling fluid and the current are proportional, so that the fluid behaves as a conventional resistor following Ohm's law. Further, the drilling fluid may be heated to enhance the collection of particulate solids. In one embodiment, the fluid may be heated to a temperature of at least 25° C. In other embodiments, the fluid may be heated to at least 50° C. or at least 75° C.

Effect of Electric Fields on Invert Emulsion Fluids

Application of voltage to an invert emulsion is one method used to determine the emulsion stability of the system. In one test, a voltage was applied between two electrodes, 1.6 mm apart, immersed in a invert emulsion fluid. A typical breakdown field is 280 kV m$^{-1}$ caused by the formation of continuous and electrically conductive particle chains between the electrodes. The electric fields used in electrophoretic separation of charged species from the invert fluids, typically 0.1-10 kV m$^{-1}$, are therefore much lower than the breakdown voltage field. The studies discussed below were conducted to determine the effect of such electric fields on invert emulsion drilling fluids.

FIG. 1A shows a laboratory test cell 100 developed to create an electric field between two coaxial cylinders. The inner cylinder 102 was a 1 mm thick copper pipe with a 15 mm outer-diameter, disposed inside an external cylinder 104, i.e., a brass cylinder, with an internal diameter of 55 mm. Acetal end-plugs 106 at the top and bottom were used to isolate the cylinders 102, 104 and create a sealed cell into which an invert drilling fluid could be poured. The inner cylinder 102 is connected to the negative terminal of a high voltage power supply (not shown) and the outer cylinder 104 is grounded. To create a radial electric field between the electrodes and through the invert drilling fluid, up to 440 Volts DC may be applied, so that the inner cylinder 102 becomes negative with respect to the outer cylinder 104.

Figure 1B:
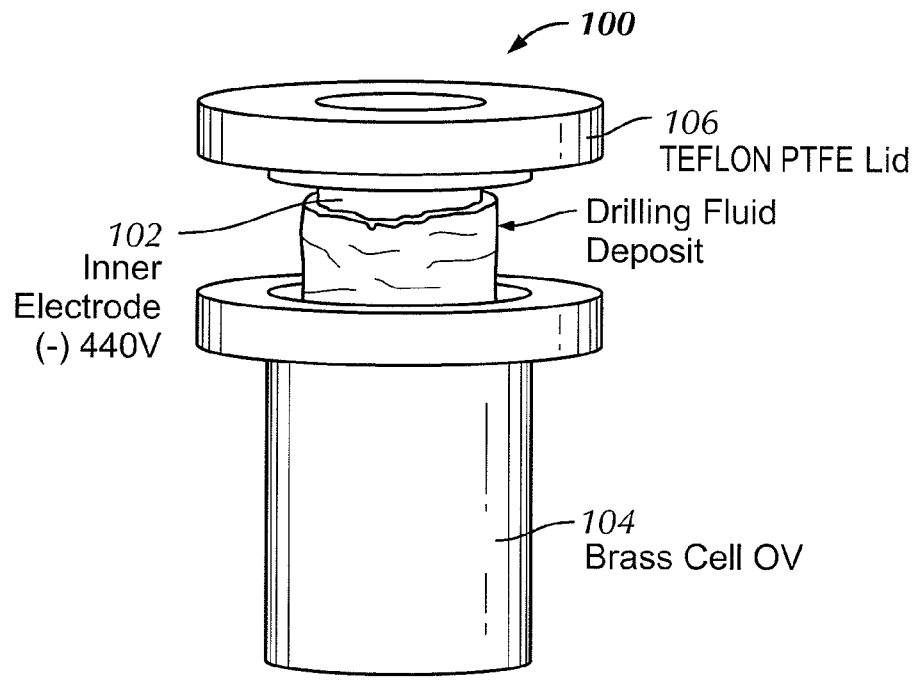
FIG. 1B shows a perspective view of FIG. 1A.

In one test, the effect of an electric field on an invert emulsion drilling fluid with a density 9.5 lb/gal and an oil/water ratio of 75:25 was examined. Over a three hour period, 440 Volts were applied to the system using the laboratory test cell 100, with the inner cylinder 102 negatively charged. Over this time, material or contaminants from the invert drilling fluid concentrated and adhered to the inner cylinder 102, forming a deposit (see also FIG. 1B) which could be removed from the test cell 100. The percentage weight of oil, water, and solids in the deposit was determined using a high temperature distillation apparatus, known as a retort. Table 1 below shows that the deposit contained a higher concentration of solids and water compared to the original drilling fluid, showing that under the influence of the electric field, both solids and brine droplets migrated towards the inner negative cylinder 102. Clay particles and brine droplets that are present as drilled solids in the invert emulsion fluid possess charges that will allow migration under the influence of the electric field. Barite (barium sulphate) weighting material, however, is inert and possesses no charge, but may become entrained in the deposit through co-migration with the other particles. The barite particles, as well as the clays and brine droplets, may also acquire charge from the emulsifiers and oil-wetting agents added to the drilling fluid system, thereby enhancing migration.

TABLE 1

Effect of voltage, on drilling fluid composition: 400 Volts for 3 hour treatment.

| Composition (% wt) | Untreated Drilling Fluid | Deposit |
| --- | --- | --- |
| Solids | 30 | 51 |
| Water | 20 | 30 |
| Oil | 50 | 19 |

In other experiments, 220 Volts were applied to an invert emulsion drilling fluid for 1 hour. Dielectric measurements were taken of the drilling fluid, the deposit, and the oil rich supernatant formed. The base oil of the tested invert emulsion drilling fluid was an internal olefin synthetic oil. Permittivity (∈) is a physical quantity without units that describes how an electric field polarizes a dielectric medium (i.e., temporarily separates bound electric charges). Conductivity (σ) is a quantity that describes the field's ability to make particles with free charges migrate under the action of the field (see Equation 1 above) towards the anode or cathode, according to the sign of the free charge. The dielectric conductivity (υ) and the relative permittivity (∈) of the samples were obtained from the capacitance C and the conductance G, measured using an analyzer (for example, Wayne Kerr Precision Component Analyser 6440 A). In this example, samples of the drilling fluid, deposit, and oil rich supernatant were placed between two adjustable electrodes, with a gap of 0.635 mm. The guard and fixed electrodes were kept at a fixed voltage and the frequency f varied from 20 Hz to 3 MHz. The experimentally-measured value of C gives $\in$ using:

$$\in = C/C_0 \quad (2)$$

where $C_0$ is the free-space (vacuum) capacitance, typically the air-capacitance $C_{air}$. Similarly, the experimentally-measured value of conductance, C, gives the dielectric conductivity, σ using:

$$\sigma = G\in_0/C_0 \quad (3)$$

where the permittivity of free space $\in_0 \cong 8.854188 \times 10^{-12}$ $Fm^{-1}$.

Figure 2A:
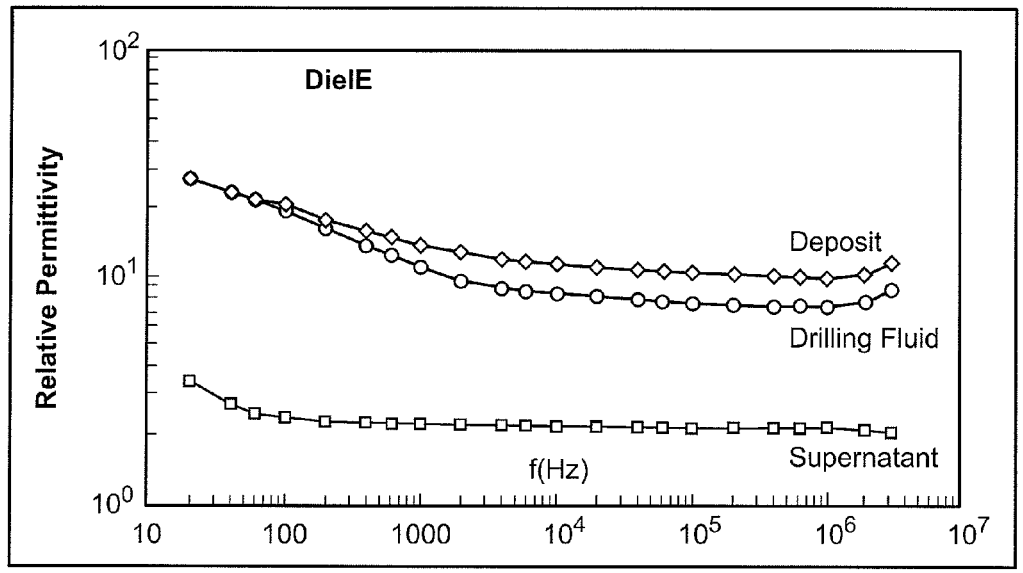
FIGS. 2A and 2B show the dependence of relative permittivity and conductivity on frequency (f) for drilling fluid, deposit and supernatant, as measured, in accordance with embodiments disclosed herein.
Figure 2B:
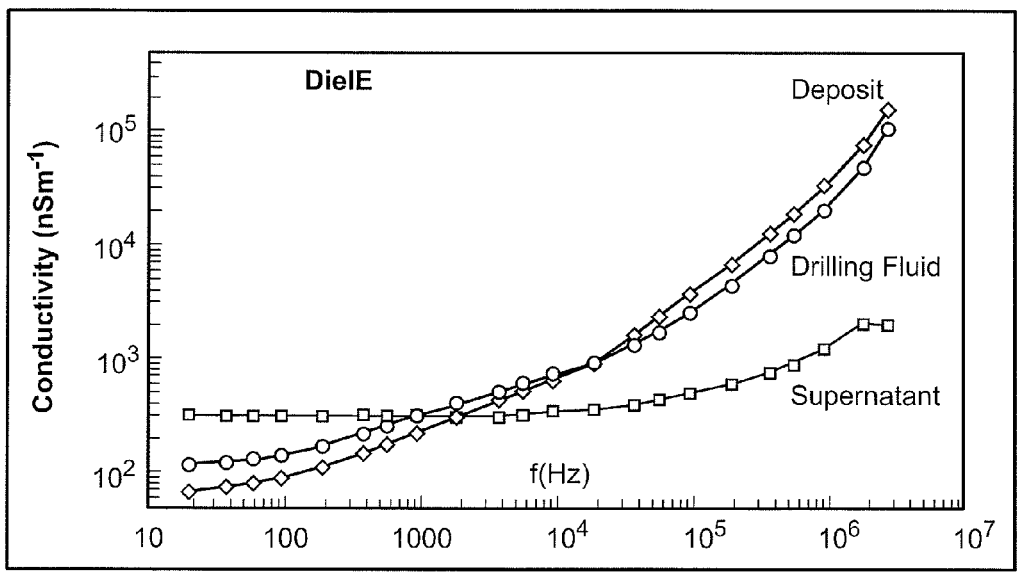

Generally, $\in$ and σ will depend on the frequency, f. FIGS. 2A and 2B show the dependence of relative permittivity and conductivity on frequency (f) for drilling fluid, deposit, and supernatant, as measured. The testing showed that the permittivity of the drilling fluid and deposit decreased with increasing frequency, but the permittivity of the deposit always exceeded that of the drilling fluid. This is concordant with the deposit having a higher concentration of solids and adsorbed surfactant than the drilling fluid and supernatant. The relative permittivity of both the drilling fluid and deposit greatly exceed the permittivity of the supernatant, because the latter contains no solids or absorbed surfactant. However, the permittivity of the supernatant is about 20-30, which is in excess of the typical measured permittivity for clean oil, which is approximately 2. This is consistent with micelles of excess surfactant dissolved in the oil.

In addition, the supernatant conductivity considerably exceeded that of both the drilling fluid and the deposit. At low frequencies, the conductivity of the deposit is less than that of the drilling fluid. This may be attributed to the extra tortuosity caused by ionic/micellar motion of extra solids in the deposit. For frequencies greater than 1 kHz, the conductivity of the drilling fluid and deposit exceeded that of the supernatant oil. This may be attributed to relaxation mechanisms such as charge-hopping. This suggests that the DC conduction while the deposit is formed is due mainly to the transport of surfactant ions or micelles, rather than charge carried by clay particles. Thus, the dielectric data for drilling fluid, deposit, and supernatant are compatible with the deposit having solids content greater than the fluid, and with conduction occurring mostly through the transport of ions or micelles in the electric field applied to the drilling fluid. These suggest that electrophoresis may occur because charged ions or micelles are attached to or adsorbed on the surface of the particles. In addition, the conductivity data (a) shown in FIGS. 2A and 2B show that, for electric fields of very low or zero (DC) frequency, the dielectric conductivity is less than 100 nS m$^{-1}$, or $10^{-7}$ S m$^{-1}$, compared with typically 1 S m$^{-1}$ for aqueous salt solutions. This small conductivity allows the electrophoretic process to proceed with small currents and, hence, a very small power requirement.

Drilling Fluid Formulation

A series of laboratory studies were conducted using drilling fluids contaminated with various chemical products to study and determine the effect of drilling fluid formulation on migration and separation of solids and brine droplets from invert fluids in an electric field. Each sample of drilling fluid was treated with 440 Volts for 3 hours using the test cell described above with reference to FIG. 1.

Figure 3:
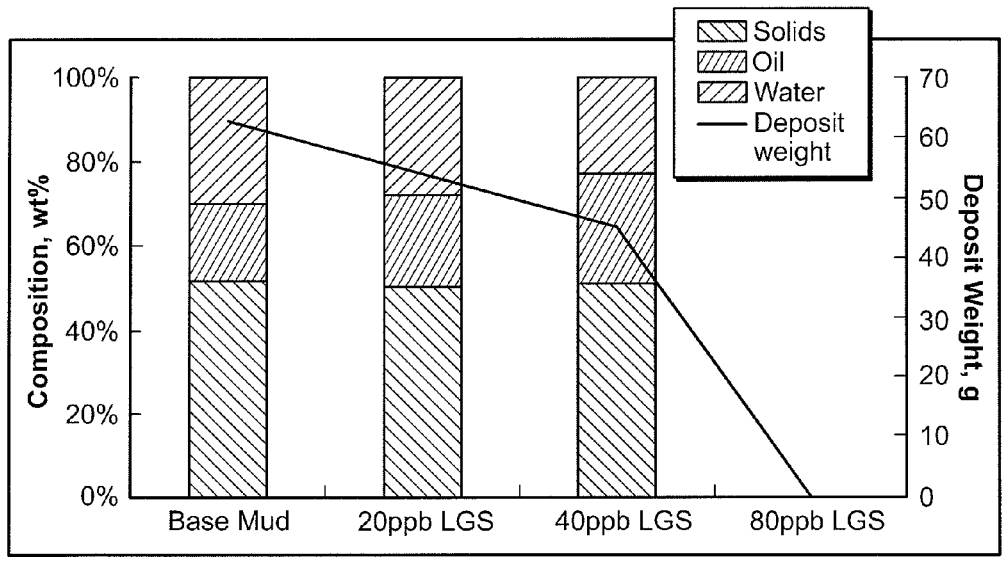
FIG. 3 shows the effect of increased LGS content on volume of deposit formation in accordance with embodiments disclosed herein.

Low-gravity solids are incorporated into drilling fluid systems during the drilling process and, although most are removed by mechanical separation techniques at the rig site, fine solids may remain and build up in the fluid. To simulate these solids in the lab tests, Hymod Prima clay and bentonite were added to the drilling fluid system, in increasing quantities. After electrophoresis treatment, it was observed that increasing the solids content lowered the volume of deposit collected. FIG. 3 shows this effect of increased LGS content on volume of deposit formation. At 80 lb/bbl contamination no deposit at all was collected.

The increased viscosity of the drilling fluid may have hindered the migration of the charged species towards the electrode. As shown in FIG. 3, the deposit had solids content consistently at approximately 50 wt % and the solids deposited included both inert barite and clay particles. The deposit also had lower water and higher oil content as the solids loading of the drilling fluid increased, causing the deposit to become increasingly lubricious so that it did not stick well to the inner cylinder. The results suggest that solids travel faster to the electrode than the brine droplets and/or that the large amount of solids hinder droplet migration. Variations in the charge due to reaction with oil wetters and emulsifiers in the drilling fluid and the charge/surface area ratio may also contribute to the differences in migration profile.

Emulsifiers are surfactants added to invert emulsions to stabilize the formulation. Primary emulsifiers are strong surfactants used mainly to stabilize the water-in-oil emulsion. Secondary emulsifiers act more as oil-wetting agents and contribute to other drilling fluid properties, such as filtration control. The surfactant molecules act at the surfaces of the brine droplets and solids particles, and therefore may affect the migration of these in an electric field.

Figure 4:
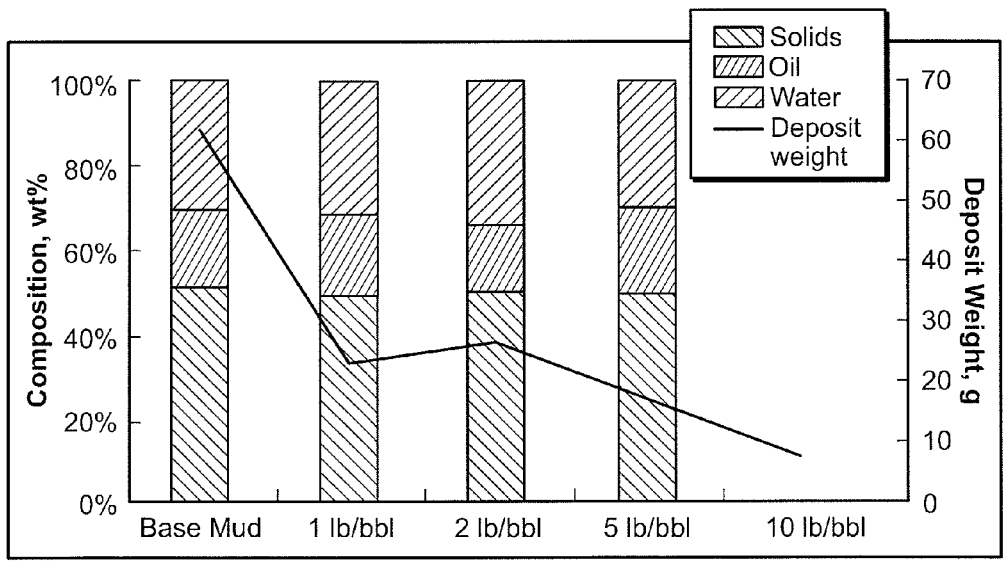
FIG. 4 shows the effect of primary emulsifier concentration on deposit formation and composition during a 3 hour test treatment at 440 Volts in a lab set up as shown in FIG. 1 in accordance with embodiments disclosed herein.
Figure 5:
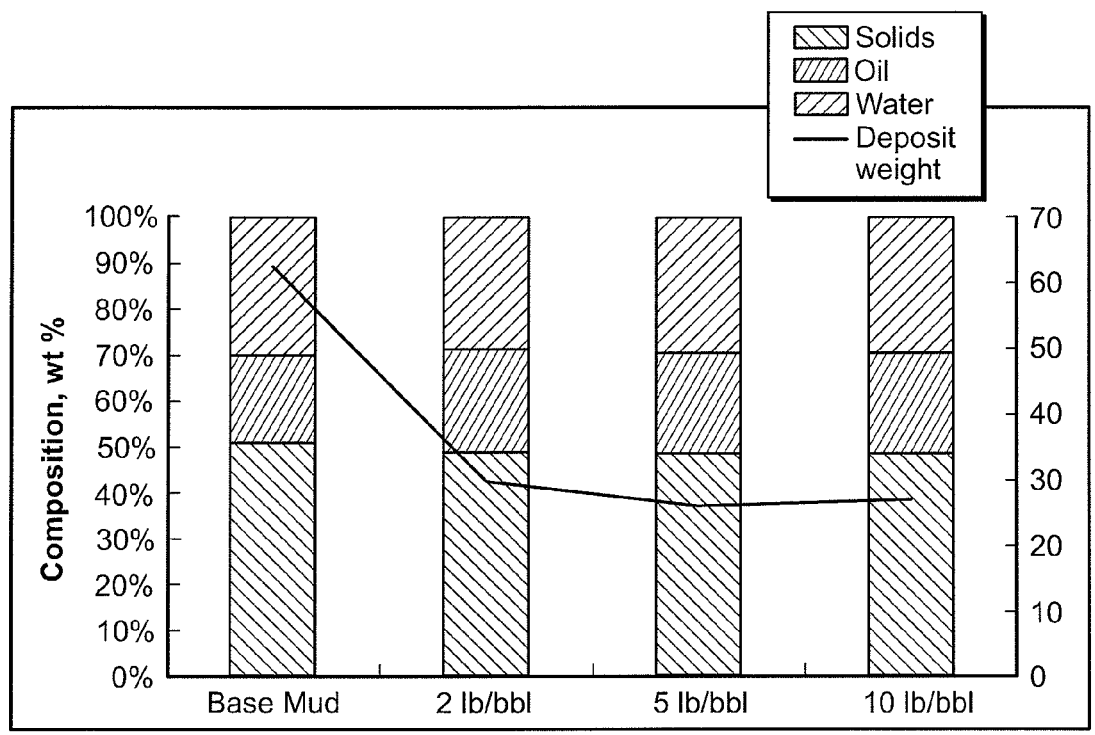
FIG. 5 shows the effect of secondary emulsifier concentration on deposit formation and composition during a 3 hour test treatment at 440 Volts in the lab set up as shown in FIG. 1 in accordance with embodiments disclosed herein.

Both primary and secondary emulsifier products at concentrations up to 20 lb/bbl were added to a standard drilling fluid and this resulted in a decreased amount of deposit formed at the inner cylinder (see 102 in FIG. 1) of the test cell. FIG. 4 shows the effect of primary emulsifier concentration on deposit formation and composition during a 3 hour test treatment at 440 Volts in a lab set up shown in FIG. 1. FIG. 5 shows the effect of secondary emulsifier concentration on deposit formation and composition during a 3 hour test treatment at 440 Volts in the lab set up shown in FIG. 1. Generally, the deposit became stiffer and stickier as the emulsifier concentration increased. As shown in FIGS. 4 and 5, the final composition of the deposit remained constant in terms of solids, oil, and water content. The results suggest that the emulsifiers slowed migration rate of the particles or droplets, but the high concentration of the emulsifier in the deposit resulted in a change in consistency.

The exact composition of invert drilling fluids and specific chemical additives used to achieve the required properties varies dependent on location, availability, environmental legislation and required drilling performance. Two alternate drilling fluid systems were tested to determine the effect of the electric field. The first fluid was based on a synthetic internal olefin and the other was a specialty fluid with a mineral oil base. Both fluids were tested using the laboratory coaxial cylinder test cell (shown in FIG. 1) and it was found that application of 440 Volts to the cylinders resulted in a deposit collected against the positive outer cylinder surface (see 104 in FIG. 1). Reversal of the voltage polarity, such that the internal electrode was now positive, allowed the deposit to once again be collected on the surface of the inner electrode (see 102 in FIG. 1). Therefore, the alternative emulsifier chemistry or novel chemical additives used in these fluids to achieve specific properties impacted the migration of species in the electric field, causing the brine droplets and solids to travel in the opposite direction to that previously observed.

Pilot-Scale Unit

In accordance with embodiments disclosed herein, an electrophoresis unit may be used in a drilling process to allow for continuous solids removal from an invert fluid. Alternatively, an electrophoresis unit may be configured off-line of the drilling process, such that treatment of the drilling fluid may be performed in batches. Generally, the design of the electrophoresis unit may include a drum electrode immersed in the fluid to be treated. The drum may be negatively charged so that solids will collect on it. In one embodiment, the drum rotates so that solids collected may be removed from the fluid. A scraper device may be used to collect the solids from the drum. The scraper device may be held against the drum by elastic cabling, releasable brackets, or other mechanisms known to those of skill in the art. The unit may also include a height adjustment mechanism that changes the drum height in relation to the bath and housing, inlet and outlet valves to fill and empty the metal bath with mud, an overflow system to prevent the bath being over-filled with mud, and a drip tray to collect any spillages.

Figure 6A:
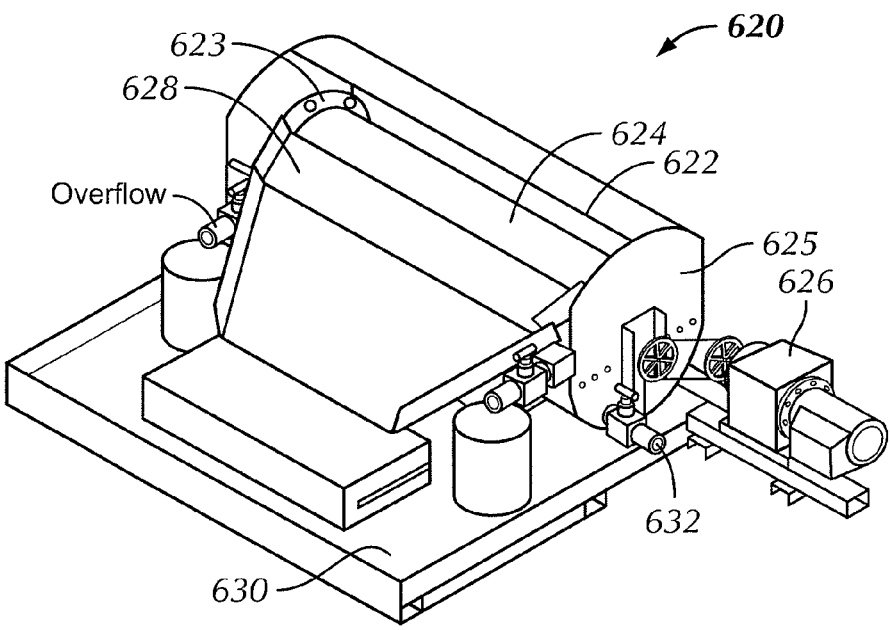
FIGS. 6A-6F show a pilot-scale unit of an electrophoresis unit in accordance with embodiments disclosed herein.
Figure 6B:
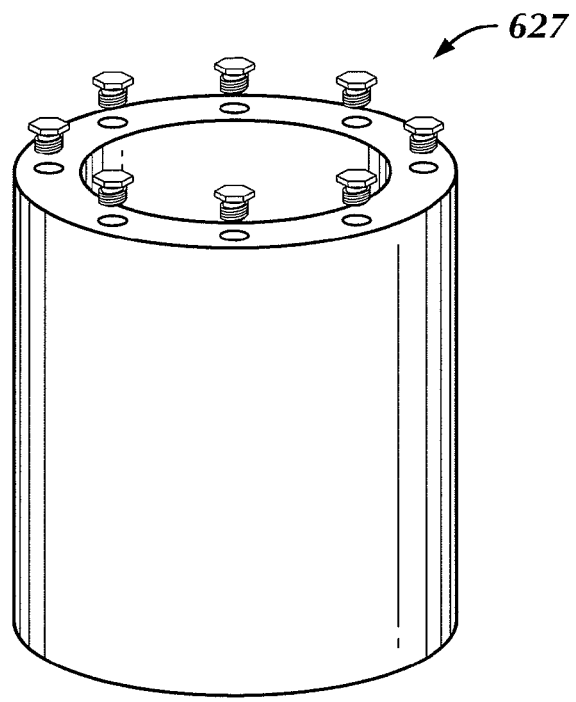

FIG. 6A shows a pilot-scale unit of an electrophoresis unit 620, similar to the co-axial cylinder configuration shown in FIG. 1. The pilot-scale unit was designed to study and determine the effect of electrophoresis on drilling fluid properties and operational parameters. In this embodiment, a metal bath 622, capable of holding 40 liters of drilling fluid, is provided as the outer cylinder. A stainless steel drum 624 is configured to be suspended into the metal bath (622) of drilling fluid and acts as the inner collecting electrode. In one example, the stainless steel drum is approximately 14 inches in diameter with a 2 inch gap between the two electrodes, i.e., between the drum 624 and the metal bath 622. In one embodiment, the drum 624 has external flanges 623 to attach the drum 624 to the bath 622 of the unit 620. Alternatively, an internal flange 627, as shown in FIG. 6B, may be used to assemble the drum 624 to the bat 622. In such an embodiment, the internal flange 627 may be made from, for example, aluminum. The internal flange 627 may include holes configured to attach the drum 624 to the bath 622.

Figure 6C:
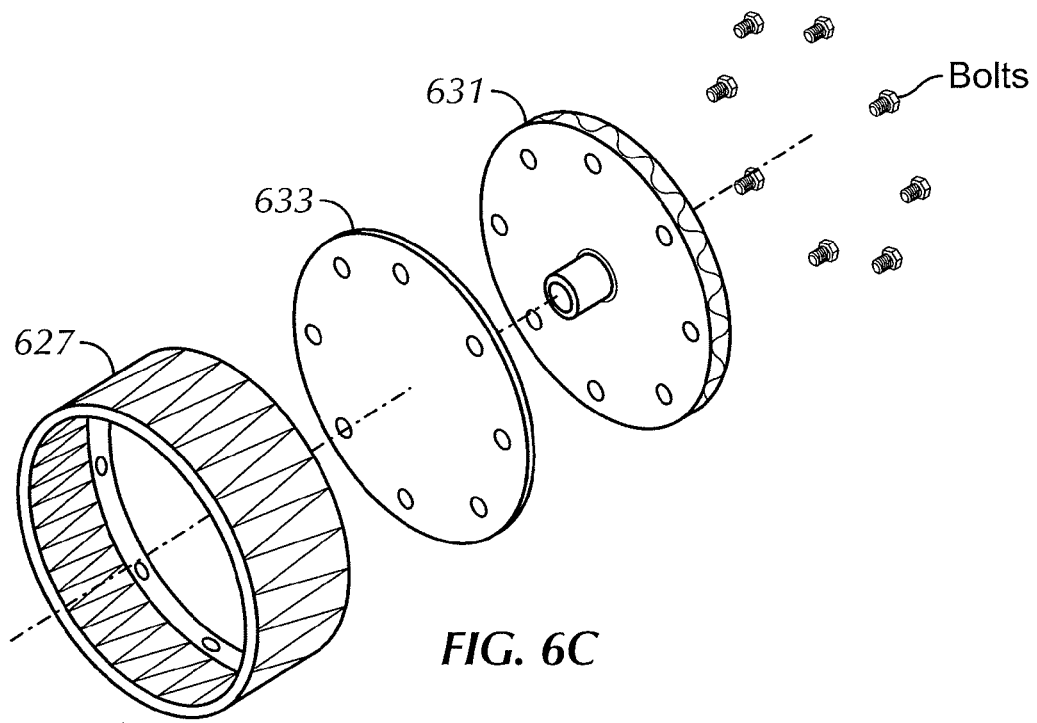
Figure 6D:
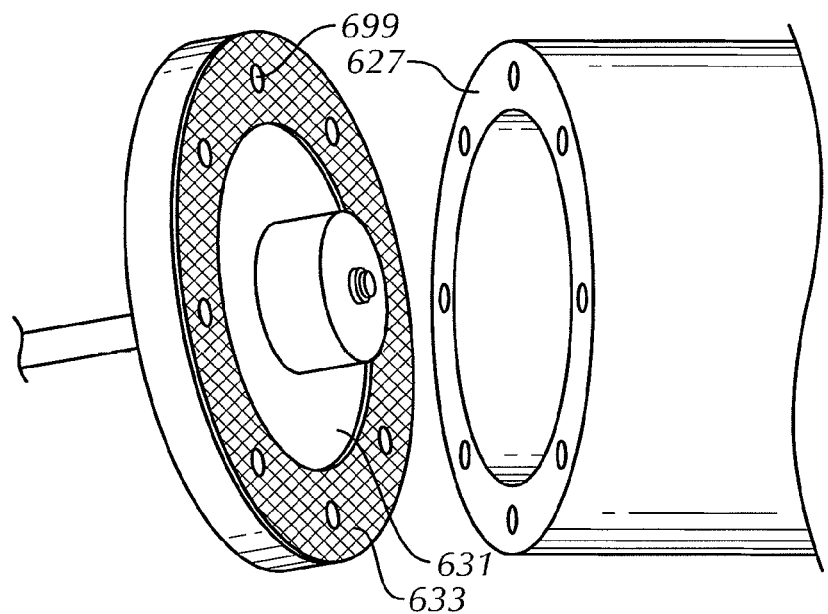

Referring now to FIGS. 6C and 6D, a drum end assembly is shown. End plates 631 made from a nonconductive material (e.g., DELRIN acetal resin) may be assembled to the internal flange 627 to both insulate the drum 624 and retain the drum 624 in the bath 622. Holes 699 may be located around the perimeter of the plate to match the bolt holes in the internal flange 627. A collar (not shown) made from nonconductive material may be located in the center of each end plate 631. A gasket 633 made from rubber or another nonconductive material may be fitted between the flanges 627 and the end plates 631.

Figure 6E:
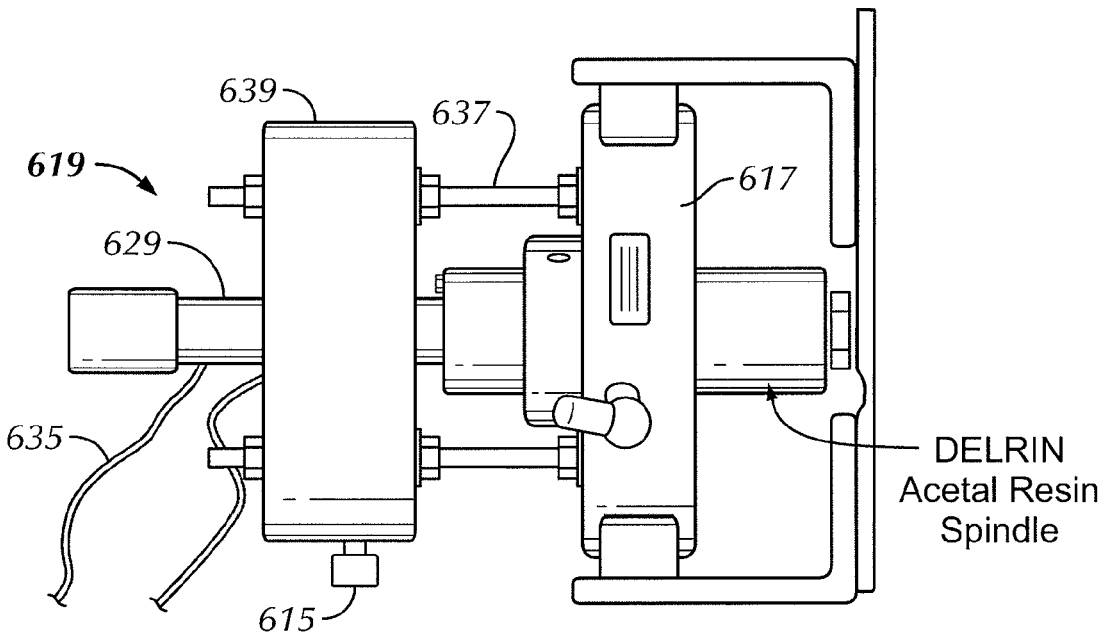

A power pack may be used to supply a voltage between the drum 624 and housing 625. Appropriate connections known to those of ordinary skill in the art to provide contact and maintain contact while the drum 624 rotates may be used. In one embodiment, the voltage is supplied to the drum 624 via a carbon brush system 619, shown in FIG. 6E, and passed along the brass rod inside a nonconductive shaft or cylinder disposed in the end plate 631, and then to the internal face of the drum electrode. The carbon brush system 619 design may include the nonconductive shaft in the end plate being fitted with brass tubing that ends in a brass block. The end of the brass rod 629 is connected with electrical cable 635 to a screw in the internal flange 627 inside the nonconductive end plate 631. A metal support frame 617 that fits over the nonconductive shaft may be fixed to the shaft by means of any fastener known to one of ordinary skill in the art. A pair of rods 637 may be drilled and tapped into the bath 622. The rods 637 are inserted into the nonconductive brush holder 639, with a central hole that surrounds a brass block. Two openings support the carbon brushes 615. The negative source from the power pack is attached to the carbon brushes and these are inserted into the plastic holder so they contact the brass block beneath. The voltage applied between the drum 624 and the bath 622 may be selected based on the desired test duration time and/or deposit collected. For example, the voltage applied may be selected from a range of 440 Volts to 3000 Volts.

The drum height in the bath may be varied, bringing the electrode closer or further away from the housing. At the lowest position, the drum is closest to the housing and a decreased volume of mud can be treated. At the highest position, the drum is farthest from the housing and an increased volume of mud can be treated.

A protective enclosure may surround the electrophoresis unit to prevent personnel approaching the unit when it is in operation. This may be achieved by placing the electrophoresis unit onto a skid with enclosed grid doors. The access doors at the front of the enclosure may be fitted with locks, such as fortress locks, electrically interlocking the power supply to the unit to the main power supply so that all electrical power is isolated when the enclosure doors are opened. A pump that is used to transfer mud from an intermediate bulk container (IBC) to the inlet port of the electrophoresis treatment unit may be disposed at the base of the skid. Such protective enclosure is discussed in more detail below with reference to FIG. 25.

To prevent tracking and arcing between the scraper blade 628 and the drum 624, the scraper 628 may be designed to maximize the distance between drum 624 and scraper assembly metallic parts. In one embodiment, the scraper 628 is formed entirely out of a nonconductive material. In certain embodiments discussed below, with respect to a full scale electrophoresis treatment unit, tracking and arcing between the scraper blade and drum may be eliminated by charging a bath in which the drum is disposed, instead of charging the drum, as discussed with reference to the pilot-scale unit.

A tensioning device may be fitted to each end of the scraper blade 628. In one embodiment, the tensioning device may include a spring, a nonconductive fastener, and bracket. The tensioning device increases pressure applied to the scraper blade 628 to ensure efficient contact with the drum 624 and therefore efficient scraping. In alternate embodiments, a piston or hydraulic actuator may be used to move the scraper blade 628, as described below with respect to the full-scale unit.

The connection of the scraper 628 to the drum housing 625 may be adjustable to allow the scraper height to be adjusted as required to ensure that the scraper 628 is level with the drum 624 and even collection of solids is obtained. A scraper support bar may be positioned into a nonconductive insert which is fitted inside steel brackets, whose position can be moved in several directions to adjust the height and positioning of the scraper.

During testing using the pilot-scale unit with the above describe scraper design, no sparking, arcing or air ionization was detected when the drum was empty, filled with mud, or during collection of deposit. However, after the unit had been left to stand over night, power tripping on over current (i.e., current >5.25 mA) at an output voltage of 300 volts was observed. At a voltage of 190 volts the output current was 4 mA (resistance of 47.5 k$\Omega$). This was confirmed with an insulation test at 500 volts which gave a value of approximately 50 kΩ. The low resistance was due to dried solids on the scraper which was in contact with the drum. When the scraper was cleaned, the insulation resistance was measured to be >50MΩ at 500 volts. It appears that dried solids have a much higher conductivity than wet solids, so the scraper should be cleaned prior to any subsequent electrophoresis testing or operations after shutdown. In certain embodiments, for example, in the full-scale unit described below, the bath 622 may be charged instead of the drum 624 to prevent such sparking or arcing.

In order to simplify the operation of electrophoresis unit and to allow the fortress lock mechanism of the skid to be connected to all electrical appliances, a metal control panel, with door-mounted start/stop push buttons and indicating lights may be included. The control panel may be interlocked with the main incoming electrical supply switch to prevent access to the live terminals inside. From the control panel, an IBC agitator, a mud pump, a drum drive, and a high voltage supply can be switched on and off. Also, the control panel may allow the installation of an emergency stop function.

A vessel of drilling fluid to be treated may be fitted with an overhead mixer, and the mud sheared to ensure homogeneity before feeding it into the electrophoresis unit. One of ordinary skill in the art will appreciated that a static mixer or any other agitation means may be used to mix and/or shear the mud to ensure homogeneity before placing the mud in the electrophoresis unit. A pump connected to the IBC or other storage vessel and to the electrophoresis unit inlet valve moves the drilling fluid from a storage vessel tap or outlet to the electrophoresis unit. Bunding may be used to isolate the test area and to contain any spills.

Once the drilling fluid in the IBC has been mixed thoroughly, the fluid is transferred to the electrophoresis unit. With the IBC tap open and the inlet and overflow taps on the electrophoresis unit open (outlet valve shut), drilling fluid is pumped from the IBC into a metal bath until the drilling fluid can be seen from the overflow taps. The pump is then switched off and all the valves closed. The high voltage power supply is switched on, so that a predetermined voltage is applied between the drum and housing. The drive motor that rotates the drum is switched on as necessary, using the dial on a variable frequency drive (VFD) to control the speed. After solids and liquids (e.g., water) from the drilling fluid are collected on the drum, they are scraped off automatically as the drum is rotated by a scraper blade. When the treatment process is deemed completed, the power pack and drive motor are switched off. Treated drilling fluid may be drained from the unit by opening the outlet valve and may then be returned to the IBC, assuming IBC volume is the same as the electrophoresis unit volume, or transferred to a separate storage vessel under gravity or using a gear pump.

Increasing the temperature of the drilling fluid prior to treatment is likely to increase the current pulled from any power pack during treatment, thereby increasing the deposit collection rate. Passing drilling fluid from the mud tank via a steam heat exchanger (e.g., a spiral heat exchanger) may be applicable in colder climates. Therefore, in one embodiment a steam boiler and a heat exchanger may be included. In such an embodiment, insulation may be provided to the bath to retain the heat in the drilling fluid contained therein and/or to protect personnel.

Figure 6F:
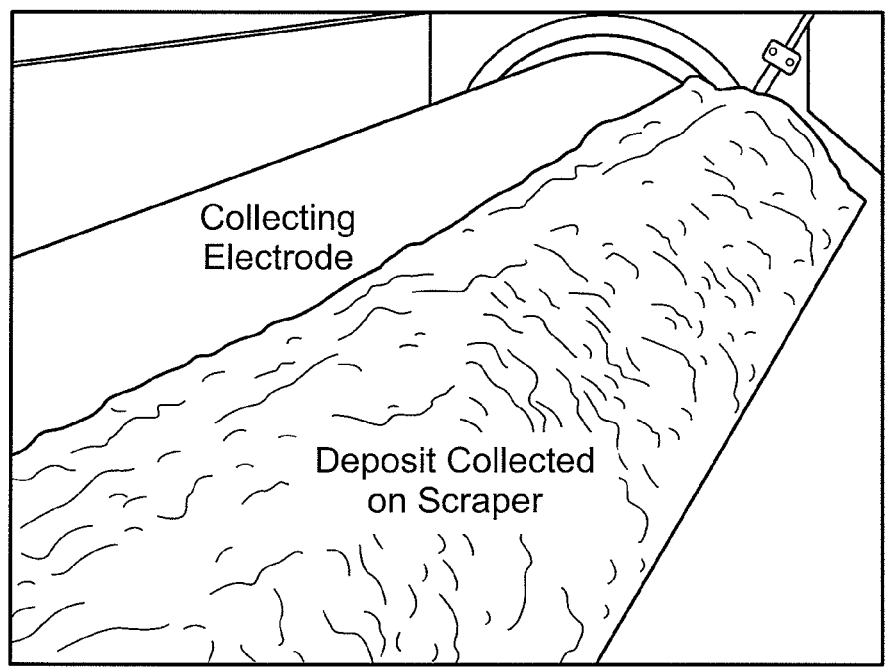

In one test, with reference to FIG. 6A, drilling fluid was pumped from a storage vessel into the bath 622. Voltage was then applied to the inner electrode (i.e., drum 624) using a high voltage generator. The electric field generated caused the deposit to collect on the immersed drum 624. After treatment the drum was rotated at 1-20 rpm using a 0.5 HP motor, gear box, and belt pulley system, generally shown at 626. The electrophoresis unit 620 also included a scraper blade 628 configured to remove the collected deposit from the drum 624. A collection pan 630 is disposed proximate the scraper blade 628 and configured to receive the deposit. FIG. 6F shows the collecting electrode, i.e., in this embodiment the drum 624, and the deposit removed by the scraper blade 628. A discharge end 632 of the metal bath 622 allows the treated drilling fluid to be pumped from the electrophoresis unit 620 and recycled or returned to a holding tank for further use.

The pilot electrophoresis unit 620 was used to determine the effect of several parameters and to determine the optimal operating conditions for treatment of invert drilling fluids. The effect of collection interval, voltage, and treatment duration was determined. After each test the properties of the treated drilling fluid and collected deposit were measured using standard protocols, as discussed above with reference to laboratory tests. The solids, water, and oil content of the deposits were converted into equivalent volumes of whole drilling fluid, with a solids, water, and oil content equivalent to original untreated fluid, to illustrate the concentration effect as a result of migration under the electric field. If the solids and water content of the deposit were in excess of that in the untreated fluid, this was expressed as additional percentage solids and water.

When operating the electrophoresis unit, the concentrated deposit can be collected at any point during the treatment cycle and multiple collection runs may be included. The benefits of increasing the time between collections (or decreasing the number of collections in a given time period) has been shown through tests where drilling fluid was treated for 4 hours, at 440 Volts. In discrete runs, deposit was collected every 30 minutes, every hour, every 2 hours and once after 4 hours.

Examples

The first set of data gathered determined the relationship between motor rpm and drum rotation rpm, through a large pulley system. At set motor rotational speeds (0-1500 RPM), the time for one drum rotation was measured. This was converted into drum RPM and plotted as a graph. These tests are discussed in more detail below.

Figure 7A:
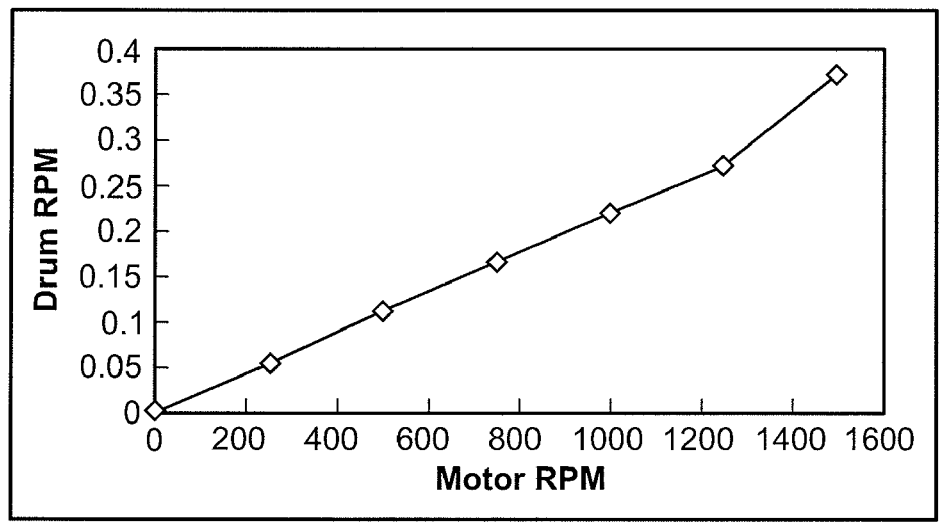
FIGS. 7A and 7B show the relationship between motor speed and drum rotation speed as determined in accordance with embodiments disclosed herein.
Figure 7B:
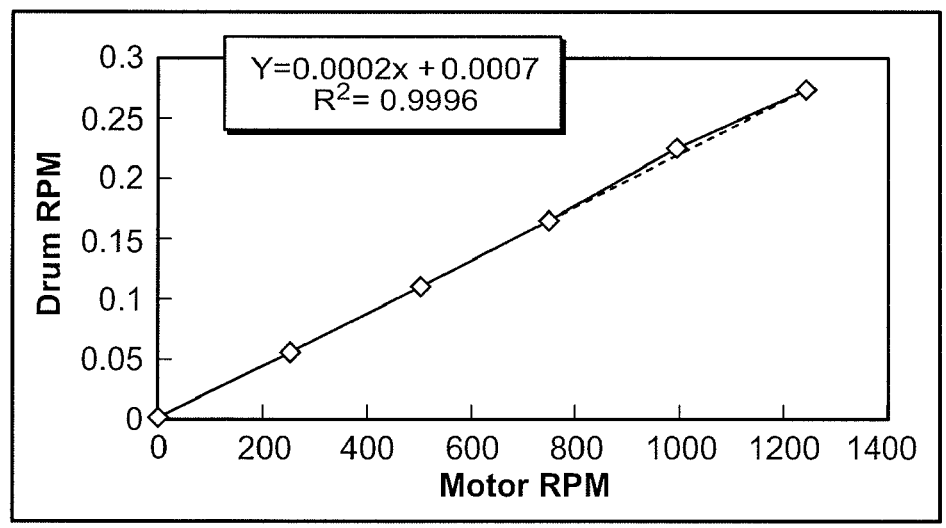

The relationship between motor speed and drum rotation speed was determined, and is shown in FIGS. 7A and 7B. The relationship is linear with drum RPM=(0.0002*motor RPM)+0.0007. At motor speeds >1400 rpm, i.e., at the upper end of the range, the relationship becomes non-linear.

A drilling fluid was pumped into the rotary drum electrode unit, with the drum at the lowest height within the bath. This allowed approximately 40 liters of drilling fluid to be added to the test unit, Tests were then performed with 440 V applied between the drum and the housing, and then the drum was left static for a total of 4 hours. After certain static time intervals (30 minutes, 1 hour, 2 hours and 4 hours) the drum was rotated at a low speed to collect the deposit formed on the drum. A full mud check on the deposits collected was performed. Tests were repeated, extending the total treatment time to 8 hours and collecting the deposit at 2 hour, 4 hour, or 8 hour intervals.

The drilling fluid was treated with 440 V over a 4 hour period, scraping and collecting solids at 30 minute, 1 hour, 2 hour and 4 hour intervals. FIGS. 8A-8F show the results achieved on analysis of the deposit collected.

In this example, electrophoresis treatment resulted in a low volume of deposit collected, containing a high volume of solids and a low volume of oil. These results suggest that longer static periods would be optimum, i.e., collection of the solids deposit one at the end of treatment (for collections up to 8 hours). Although a high amount of solids is collected with low static time, the process acts as a mud transfer system transferring large amounts of oil and water also. The volume of additional (concentrated) solids present is low. As the static time increases, the volume of additional solids increases and the volume of mud transfer decreases. Therefore, longer static time results in a lower volume of deposit collected, but a faster treatment of the drilling fluid to decrease the low gravity solids content.

Treatment in this manner over an 8 hour period at ambient temperature resulted in a 70% treated mud volume and recovery of 80% of the total oil. Further, the density decreased from 11.7 ppg to 9.1 ppg while the oil-to-water ratio (OWR) increased from 76:24 to 88:12. Also, the percent solids contained in the drilling fluid decreased from 22% to 13.5% with both a reduction in LGS and HGS. There was a 30% deposit volume that contained 36% solids and had an OWR of 58:42. Fifty five percent (55%) of the total solids present were recovered in the deposit, and both LGS and HGS were collected.

Figure 9:
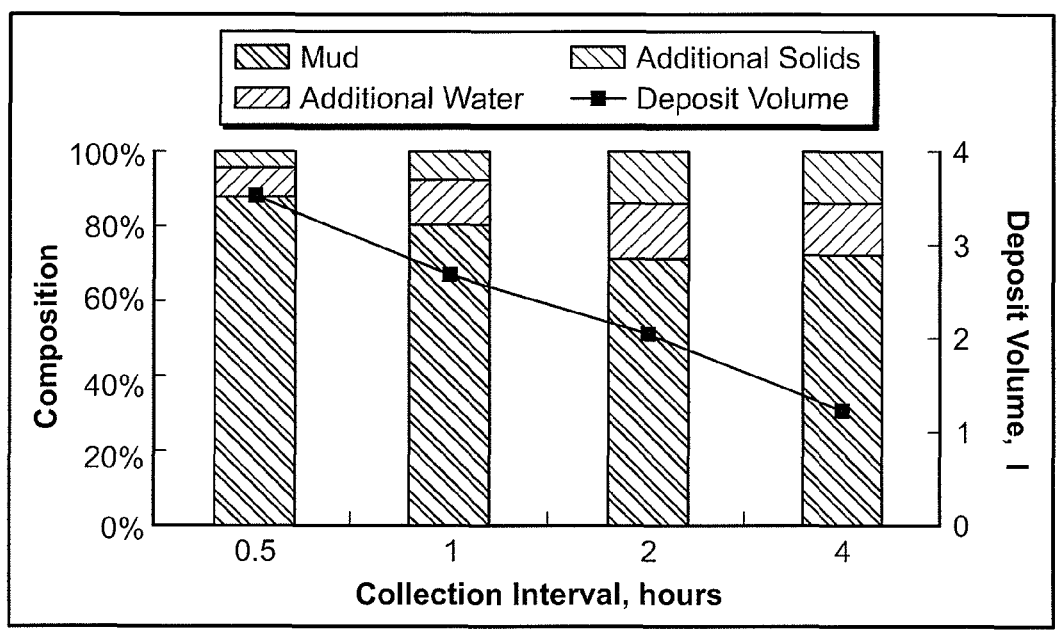
FIG. 9 shows the effect of collection interval on deposit volume and composition for drilling fluid treated at 440 Volts for 4 hours with the pilot unit in accordance with embodiments disclosed herein.

As shown in FIG. 9, as the interval between collection runs increased from 30 minutes to 4 hours, the volume of deposit collected decreased. The large volume of deposit collected using short collection intervals did not show an increased concentration of solids and water compared to the untreated fluid and in this case, the rotating drum (624 in FIG. 6) acted as a whole drilling fluid transfer system only. As the collection interval increased, the volume of additional solids and water in the deposit increased and the volume of whole fluid transfer decreased. Therefore, longer static time results in a lower volume of deposit collected, but a faster treatment of the drilling fluid to decrease solids and water content.

Figure 10A:
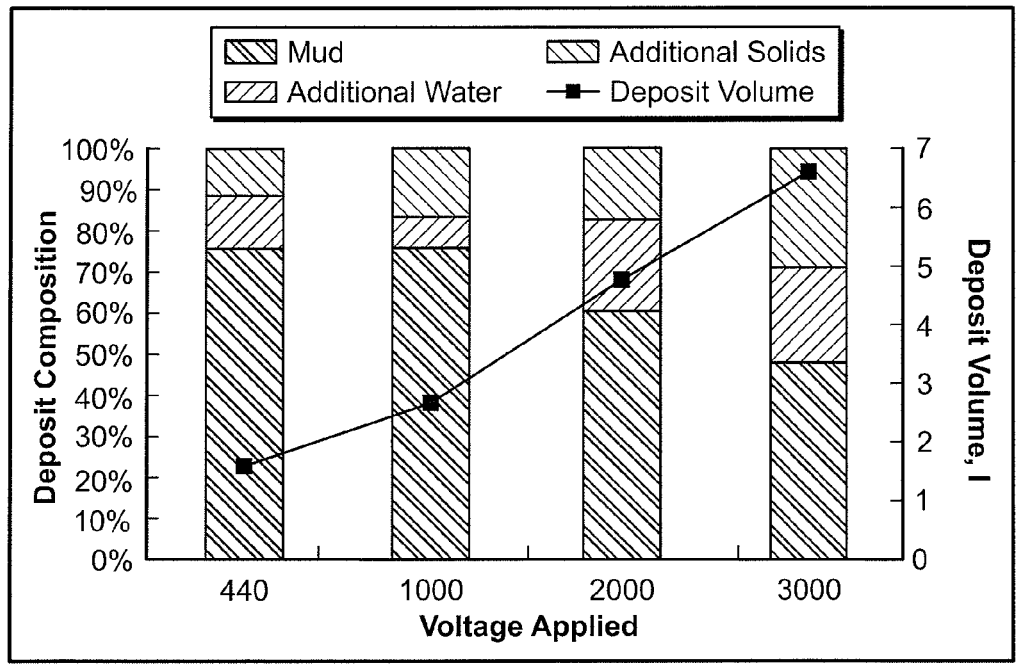
FIGS. 10A and 10B shows the effect of voltage on deposit volume and composition for drilling fluid treated for 4 hours in the pilot unit in accordance with embodiments disclosed herein.
Figure 10B:
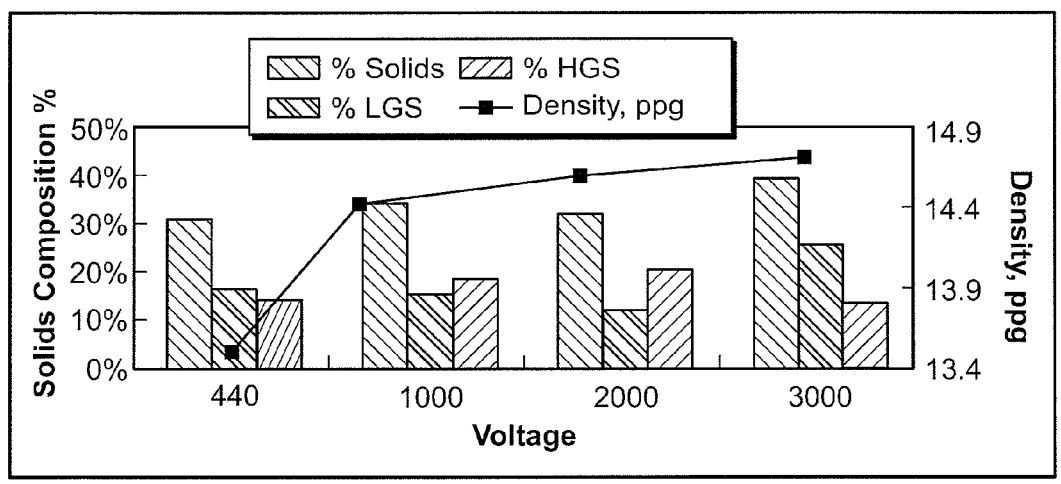

From the deposit properties and the results shown in FIG. 10A, it can be seen that increasing the voltage increased the total volume of deposit collected. An increase in voltage applied to the collecting electrode may increase migration velocity of charged species, giving faster treatment rates and a greater build up of deposit. As shown in FIG. 10A, for tests over 4 hours, with the voltage increasing from 440 Volts to 3000 Volts, the total deposit weight collected increased approximately linearly with voltage. The composition of the deposit also changed with a larger volume of solids and water being attracted and concentrated at the electrode as the voltage increased. In addition to generating the largest deposit, the highest voltage (3000 V) also resulted in the lowest whole mud transfer, and the highest percentage of additional solids removed from the mud. This correlated to an increase in deposit density with voltage (FIG. 10B) and an increase in the total solids observed in the retort measurements. The oil/water ratio of the deposit decreased from 77:23 to 50:50 as the voltage increased. Therefore, the higher the voltage the better the performance will be achieved in terms of solids and brine removal to return the drilling fluid to acceptable properties.

Figure 8B:
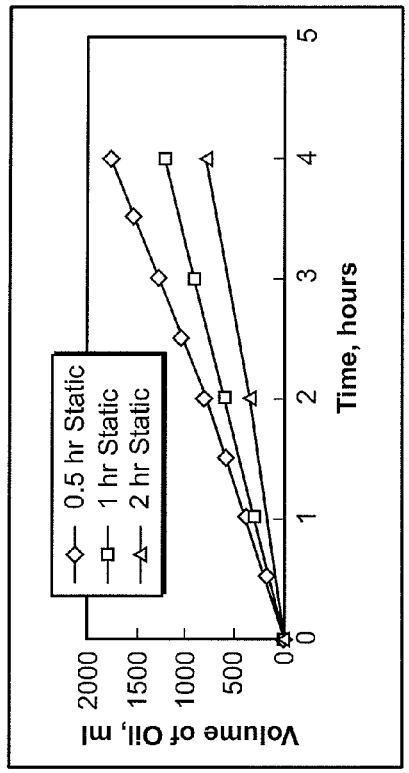
FIGS. 8A-8F show the results achieved on the analysis of the deposit collected when drilling fluid was treated with 440 V over a 4 hour period in accordance with embodiments disclosed herein.
Figure 8D:
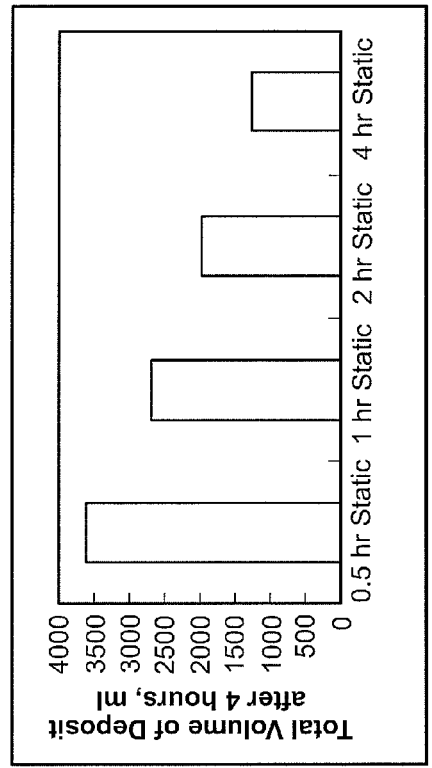
Figure 8A:
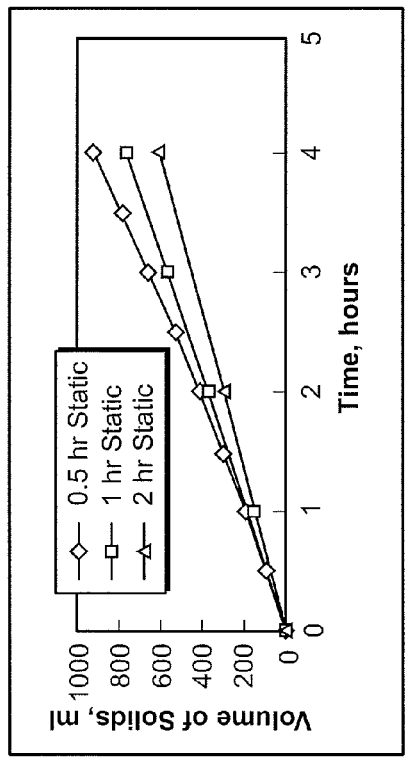
Figure 8C:
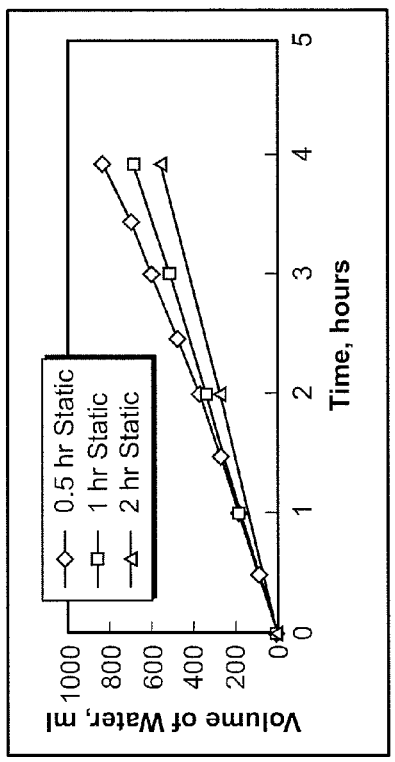
Figure 8E:
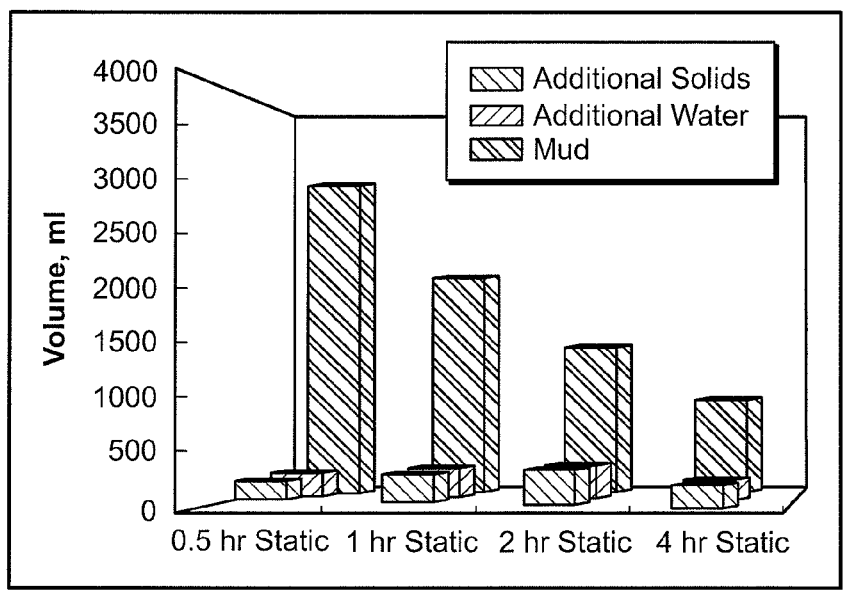
Figure 8F:
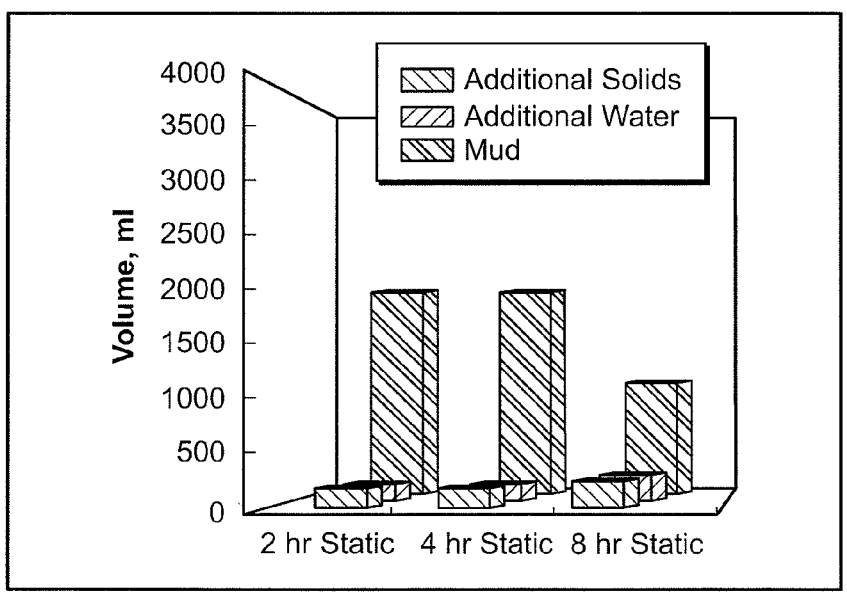

Increasing the total treatment time to 8 hours and scraping the solids every 2 hours, 4 hours, and 8 hours showed a similar trend (FIG. 8F). For optimum solids removal, the longer the static time the more efficient the process.

As the electrophoresis unit was designed to be a continuous treatment method, with the drum rotating at all times to collect deposit, the effect of drum rotation speed was investigated. Again the drum was filled with approximately 40 liters of an invert emulsion drilling fluid and 440 V applied. The drum was continually rotated for 8 hours at 0.01, 0.02 and 0.06 RPM. The solids were collected and a full mud check performed.

Figure 11B:
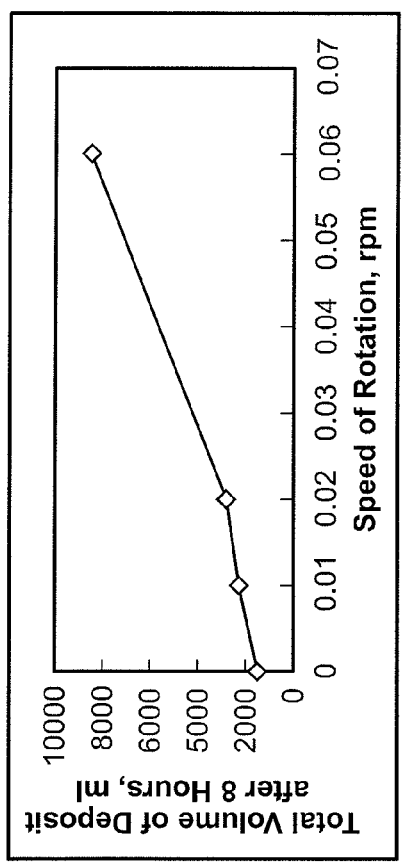
FIGS. 11A-11D show the effect of drum rotation speed on the deposit collected in accordance with embodiments disclosed herein.
Figure 11D:
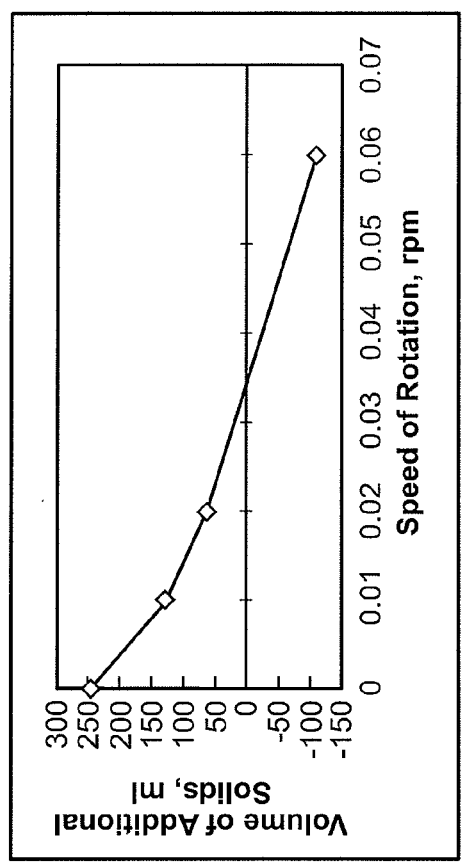
Figure 11A:
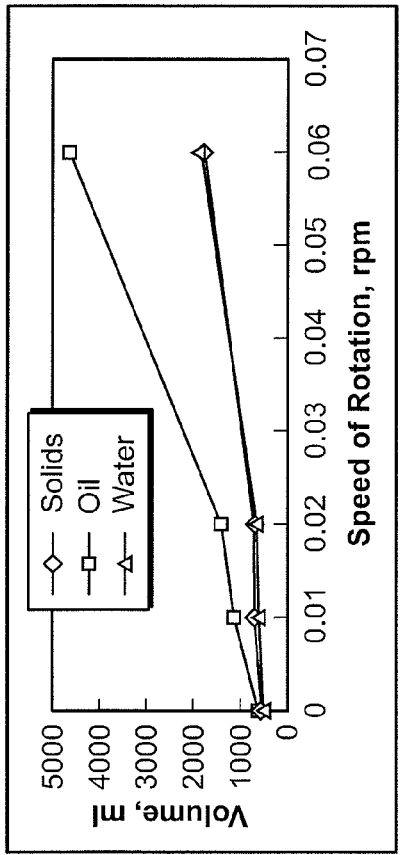
Figure 11C:
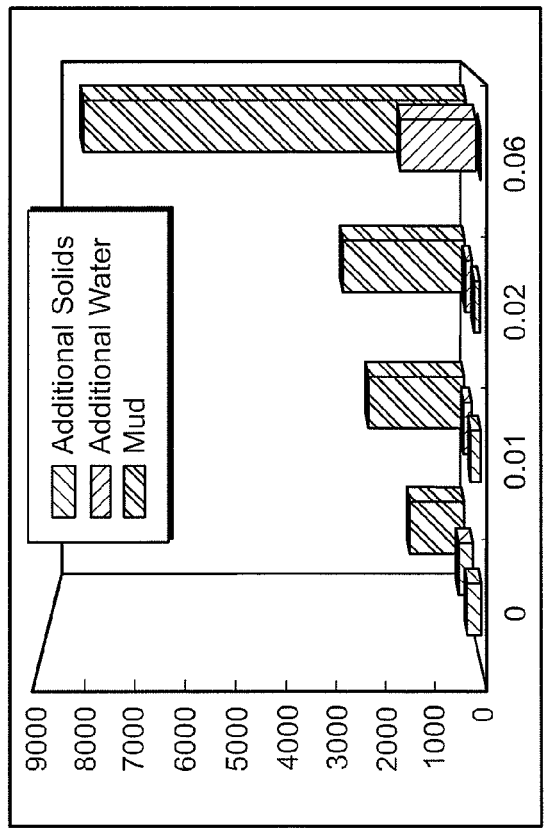

The effect of continuous rotation of the drum during treatment of a drilling fluid, using 440 V was tested over an 8 hour period. The drum speed was varied from 0.01 RPM to 0.06 RPM, and the results compared to that achieved with a static drum (0 RPM). FIG. 11A shows that as the speed of rotation increases the volume of solids, oil, and water recovered increases and, therefore, the total deposit volume increases (FIG. 11B). This trend is not linear with rotation speed and effects of the treatment become more severe at higher speeds. When the data is converted to the volume of whole mud transferred (FIG. 11C) and the volume of additional solids and water collected by electrophoresis, it can be seen that low RPM speed gives the highest additional solids removal and lowest mud transfer, thereby giving a more effective treatment. Plotting the volume of additional solids collected against drum RPM (FIG. 11D) it can be seen more clearly that the volume of additional solids collected increases as drum RPM decreases. At speeds greater than 0.035 RPM, the amount of additional solids is shown as a negative value. This means that for the volume of oil recovered in the deposit, the actual amount of solids recovered was less than the equivalent amount of solids contained in the drilling fluid with that oil quantity. The quantity of additional solids removed during a static test could not be achieved.

Experiments have shown that shearing decreases the deposition rate, but the effect was small at shear rates less than 10 $s^{-1}$. A drum rotational speed of 0.06 RPM gives a circumferential linear speed of about 1.4 mm $s^{-1}$, and to obtain a shear rate of 10 $s^{-1}$, requires that the bulk of the drilling fluid is slightly gelled, with all the shearing taking place in a region of thickness of 0.14 mm, i.e., slightly larger than a single barite particle. On this model, the sheared volume is very small. If the whole mud volume (of thickness about 0.05 m) is subject to shear, the shear rate for a rotational speed of 0.06 RPM is about 0.03 $s^{-1}$, which should have a negligibly small effect on the rate of deposition. It is possible that dynamic barite sag occurs in the region at the drum surface and the falling barite acts on the fines in opposition to the electric force, particularly at the lowest part of the roller that is close to horizontal.

Figure 12A:
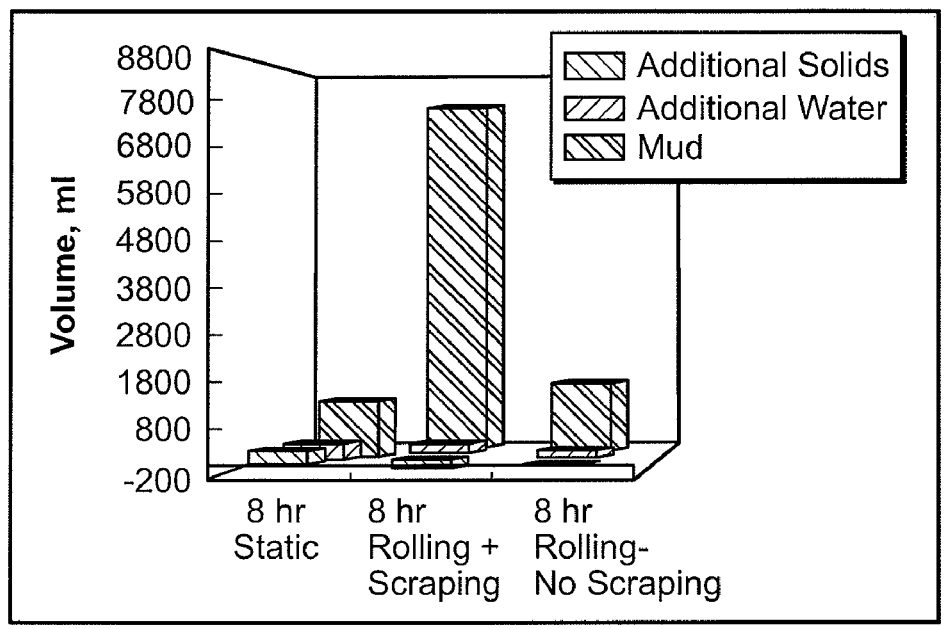
FIGS. 12A and 12B show the effect of scraping and rotation on the deposit collected in accordance with embodiments disclosed herein.
Figure 12B:
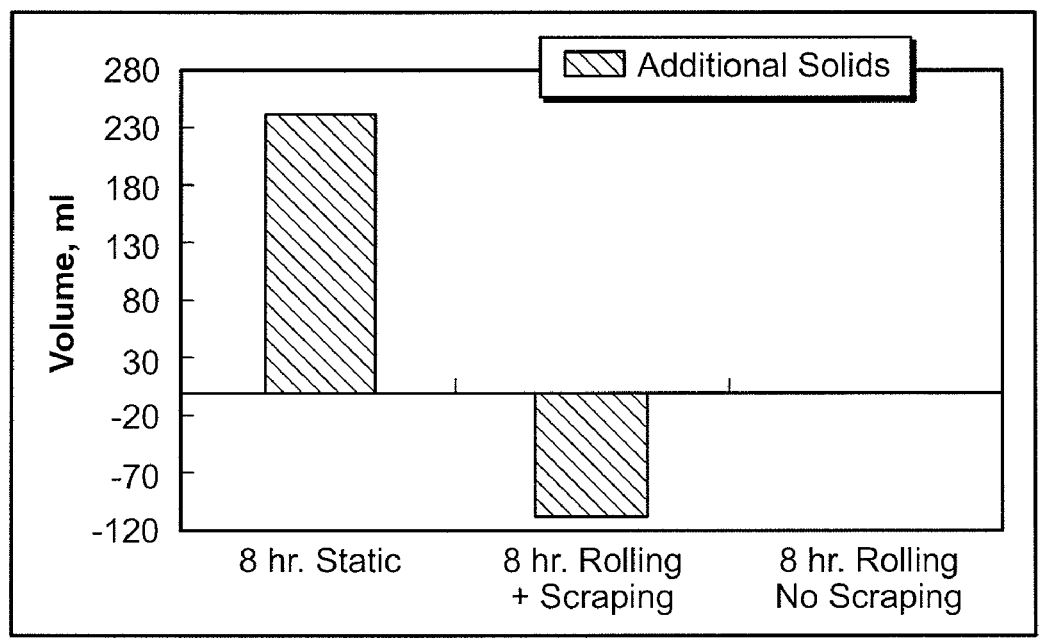

A further set of tests were performed for 8 hours at 440V, where the drum was allowed to continuously rotate at 0.06 RPM for 8 hours with no scraping of solids. After the treatment period (e.g., 8 hours) the scraper was replaced and the deposit was collected and analyzed. The data was compared to the amount of mud, additional water, and additional solids recovered during an 8 hour static test and an 8 hour test with continuous rotation and scraping. The deposit collected was lower in volume than the continuously scraped test but substantially thicker, i.e., higher in solids. FIGS. 12A and 12B show that if the solids are not removed continuously, but allowed to accumulate while the drum rotates, the amount of additional solids recovered increases, yet this amount is still significantly less than that achieved with a static test. The solids content of the deposit was very close to that of the mud being treated and the electrode served only to transfer mud from the unit with little solids being removed from the remaining fluid. Therefore, removing the scraper did allow solids accumulation, but rotation decreased the efficiency so that a negative volume of additional solids was still observed.

Tests were also performed at 3000 V for 8 hours, continuously rotating the drum at 0.1 RPM. The mud and deposit properties achieved were compared to the same treatment, with the drum static throughout the entire treatment period.

Figure 13:
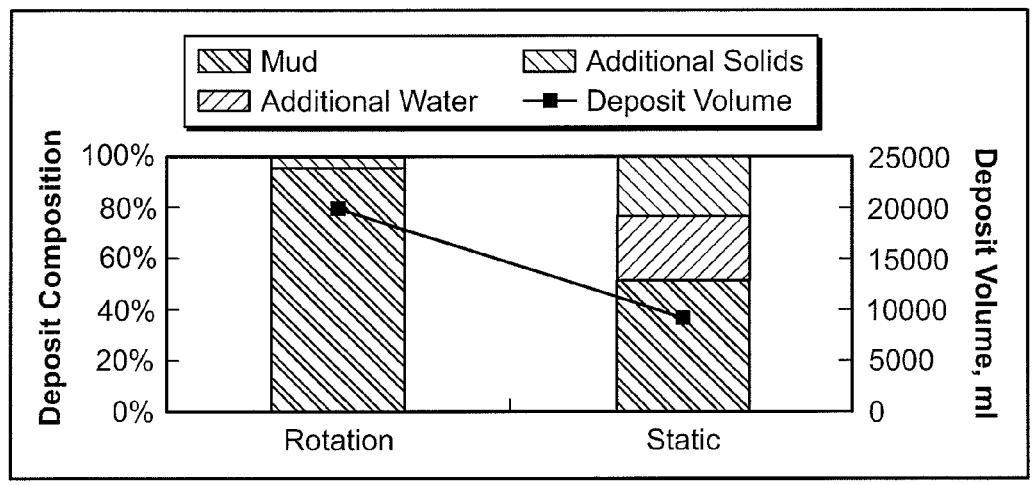
FIG. 13 shows deposit composition after continuous and static conditions in accordance with embodiments disclosed herein.

As shown in FIG. 13, continuous rotation generated a much higher deposit volume than static conditions, although analysis of the composition of this deposit showed that 97% of the deposit had the same constituents as the original mud and only 3% of the volume was attributed to concentrated solids or water. This shows that continuous rotation of the drum acts like a mud transfer device and does not allow a deposit to be collected that will remove solids and water from the mud and leave a high treated mud volume. The deposit collected after 8 hours static was much lower in volume, but contained less whole mud and a concentration effect of solids and water was observed.

Figure 14:
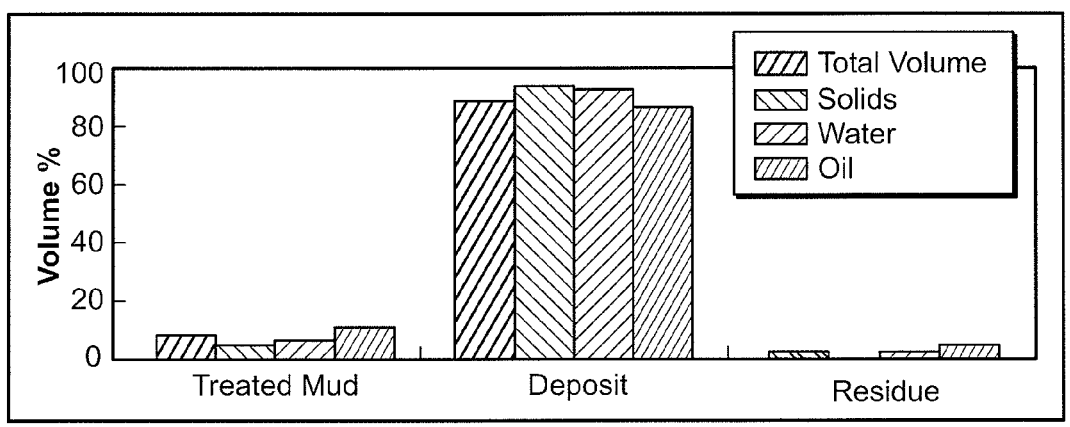
FIG. 14 shows volume balance of continuous rotation in accordance with embodiments disclosed herein.
Figure 15A:
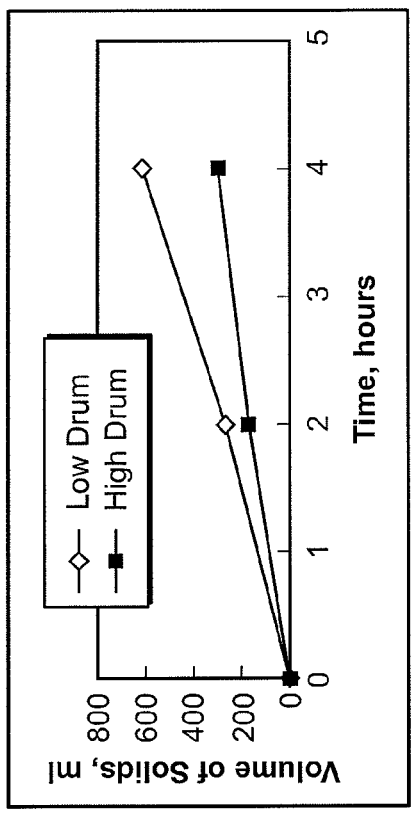
FIGS. 15A-15E show the effect of drum height on the deposit collected in accordance with embodiments disclosed herein.
Figure 15B:
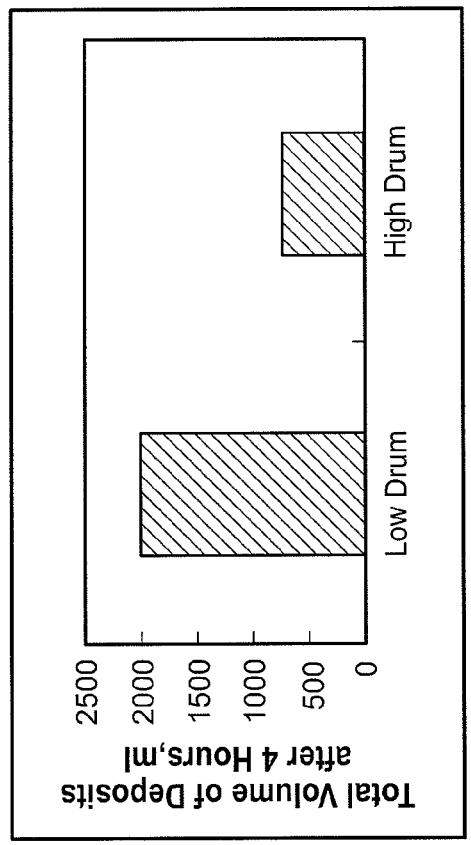
Figure 15C:
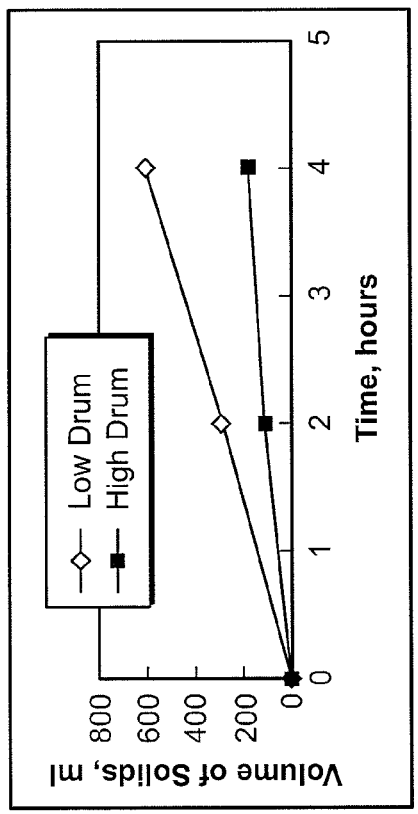
Figure 15D:
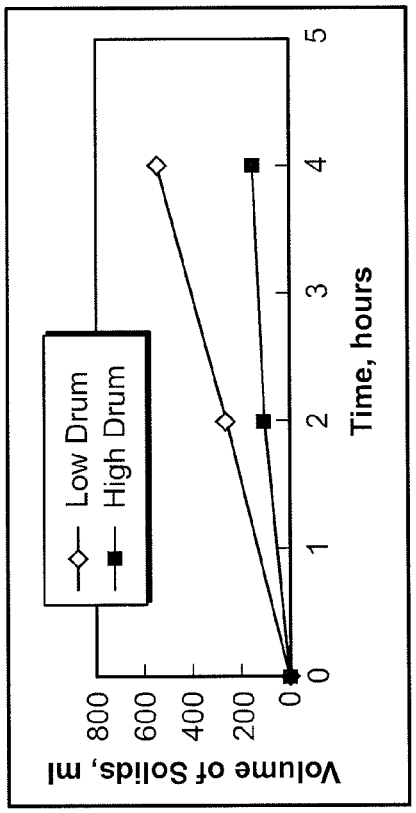
Figure 15E:
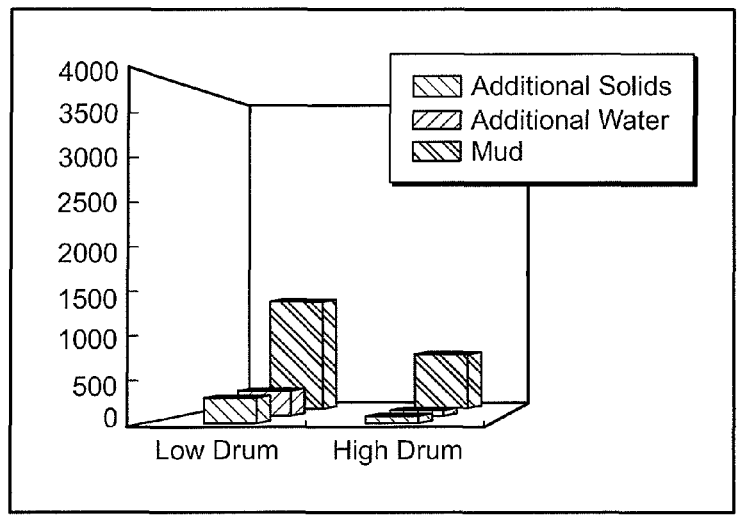

The volume balance is shown in FIG. 14, the results indicating that 90-98% of the solids, water, and oil from the drilling fluid were transferred to the deposit. Therefore, static collection of deposit is the optimum operational method.

Two four hour tests, at 440 V, were performed with the drum at the lowest and highest position to investigate the effect of drum position on treatment rate. Deposit was collected every 2 hours. FIGS. 15A-15E show the results from analysis of the deposit collected based on drum height. At a low drum height the volume of mud in contact with the collecting electrode is greater, and the field gradient between the drum and housing is higher due to the smaller distance. As a result, the volume of solids, oil, and water (and, therefore, total deposit volume) was increased at the low drum height. This translates to a larger volume of whole mud being transferred, but also an increase in the amount of additional solids removed from the mud in the unit. Therefore, the low position for the drum resulted in increased solids removal efficiency.

In one embodiment, an electrophoresis rotational apparatus design is able to operate at voltages up to 3000 V. Low gravity solids (LGS), high gravity solids (HGS), and water can be removed from the invert emulsion drilling fluid under controlled conditions. Without being bound to a particular mechanism, the inventor believes that the presence of emulsifier allows these particles/droplets to migrate more efficiently.

An invert emulsion drilling fluid may be agitated to ensure homogeneity before being pumped into the electrophoresis rotational apparatus. Once full, the electrophoresis rotational apparatus is powered up by switching on a high voltage power pack. A deposit will be collected on the immersed electrode. After a predetermined period, the deposit may be removed by one rotation of the collecting drum, with the deposit being scraped off and collected in a collecting pan. The treated mud may then be pumped out of the electrophoresis rotational apparatus unit.

Significant quantities of water can also be removed from the drilling fluid as part of the deposit in the electrophoresis process. Although brine droplets will posses dipoles, the droplets will also be surrounded by a layer of emulsifier molecules that may posses a charge.

Barite, which is inert, may also be removed as part of the deposit. The inventor believes that the mode of action of electrophoretic separation may be dependant on the emulsifier package of the mud making LGS, HGS, and brine droplets charged so that they migrate under an electric field. As a result of removal of the deposit from the drilling fluid, a decrease in mud weight and solids concentration may occur.

It has been observed, that the initial current pulled when 3000 V is applied to the mud is high. The starting current has been shown to be independent of mud temperature based on a linear regression of the data points, with the average current pulled being 2.4 mA at 3000 V.

Figure 16A:
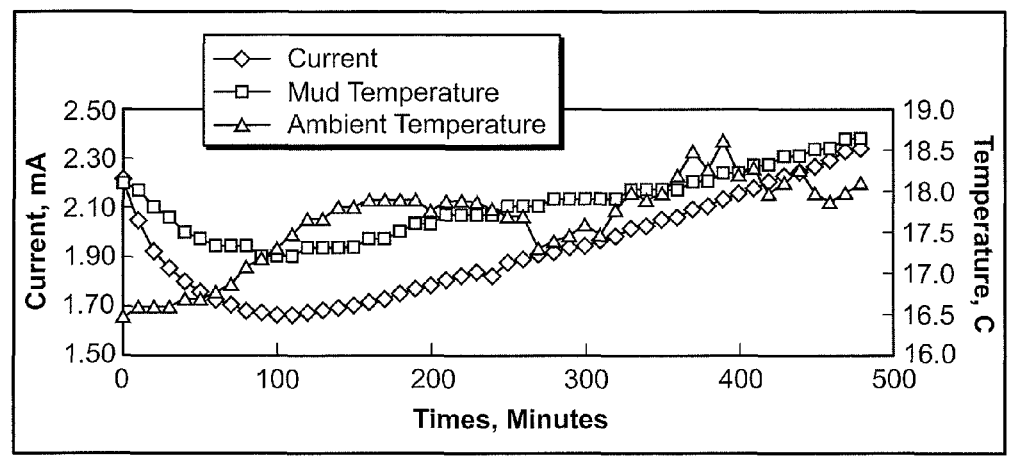
FIGS. 16A and 16B show trends in current with temperature and the effect of temperature on minimum current observed at 3000 V in accordance with embodiments disclosed herein.
Figure 16B:
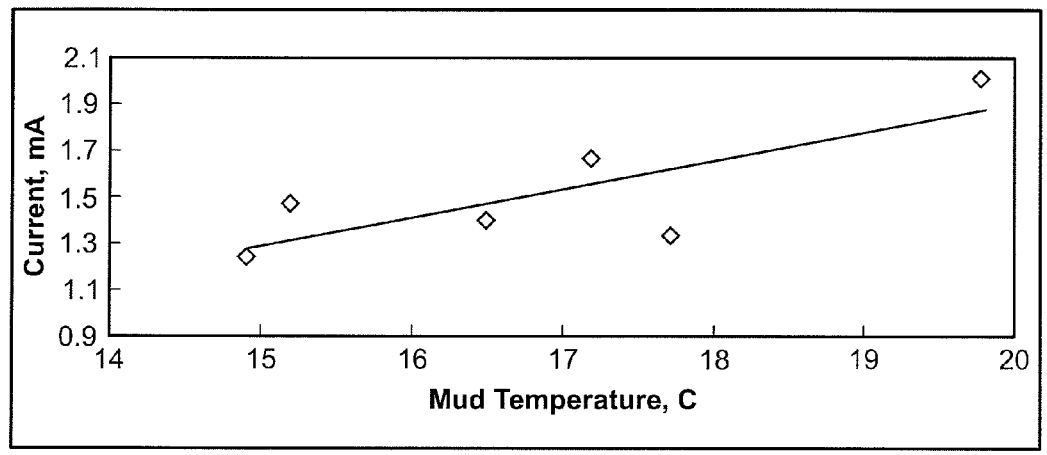

A typical current/temperature profile for the tests performed at 3000 V, explained below, is shown in FIG. 16A. This shows that current decreases with time immediately after the voltage was applied. This initial decrease in current is typical of energized insulating mediums, being a function of decaying capacitive and absorption currents. The minimum current reached in each test is seen to be temperature dependant (FIG. 16B), i.e., the lower the temperature, the lower the current. Subsequently, as the drilling fluid heats or cools to reach ambient temperature the current increases or decreases respectively. In the example shown in FIG. 16A, the mud initially cools to ambient temperature and the current decreases. As the ambient temperature is seen to increase during the test period, the mud temperature and current are also seen to increase. In other test examples, where deposit was collected at times throughout the test, current spikes were observed after each sampling point and the current decrease then temperature dependency then followed the trend described. Variations in mud temperature could therefore have a considerable influence on electrophoresis current and possibly solids collection rate.

Increasing the length of time over which voltage is applied may allow a greater process time and greater concentration of solids and water at the collecting electrode. With 3000 Volts applied, the total treatment time was increased from 1 hour to 8 hours. The volume of the deposit generated increased, with all deposits showing concentration of water and solids compared to the original drilling fluid.

Figure 17:
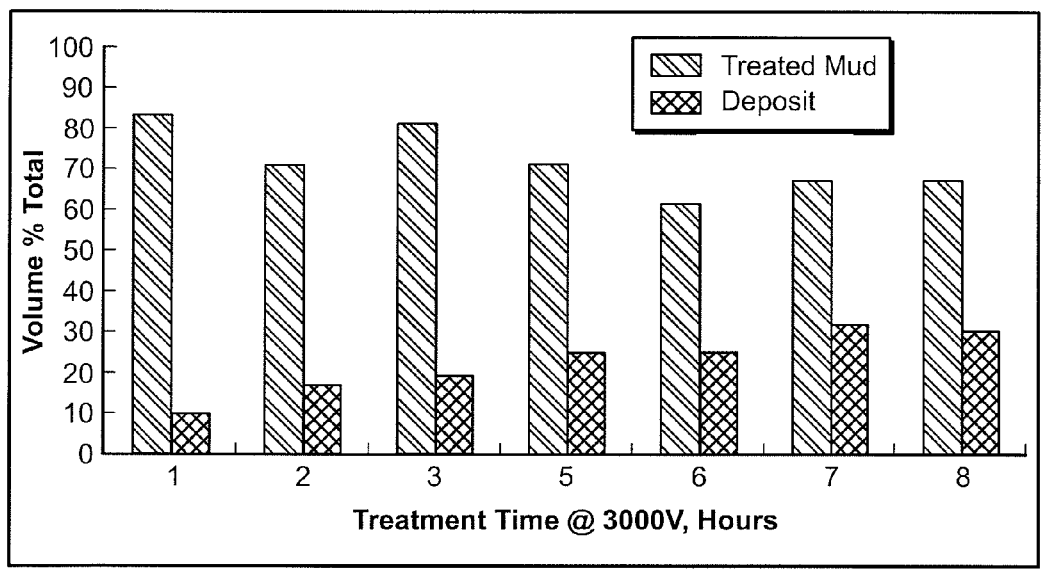
FIG. 17 shows the effect of treatment time on deposit recovery at 3000 Volts in the pilot unit in accordance with embodiments disclosed herein.

The optimum treatment length ensures a low oil removal and a deposit with maximum solids and water concentration. After 8 hours, 9.5 liters of deposit was collected which represented 30% of the total drilling fluid being treated. These results are shown in FIG. 17. Approximately 50% of the solids in the fluid were collected as the deposit, with only 14% of the available oil removed. Qualitatively, the deposit collected after 8 hours static at 3000 Volts was much deeper, or thicker, on the drum (30-40 mm) and had a thick and sticky consistency (See FIG. 6F).

Testing on the pilot unit has shown that long collection interval and treatment time with a high voltage are optimal. Therefore, testing at 3000 Volts applied to the inner electrode, over an 8 hour period, with one deposit collection cycle was used to define the effect on the properties of the treated drilling fluid. Properties such as density, viscosity (plastic viscosity and yield point), and composition were determined, as per standard API techniques for drilling fluid testing. The deposit removed was heavy as it contained a large quantity of solids, some of which was high density weighting material used in the drilling fluid for density. The deposit also contained a large quantity of water.

The deposit constituted 30% of the drilling fluid volume, and, therefore, 70% was recovered as treated fluid. In this treated fluid, the water and solids content was decreased to almost half of that present in the original system, whilst the valuable oil component was recovered at 80%. This translates to the recovery of a drilling fluid with lower density, increased oil/water ratio, and a lower viscosity profile. In the example shown, the density was reduced from 12 lb/gal to 9.1 lb/gal, the total solids content decreased from 23% to 13.5%, and the oil/water ratio increased from 77:32 to 88:12, all resulting in a thinning of the fluid and a decrease in both the plastic viscosity and yield point. Table 2 summarizes the treatment mass balance for 8 hours of treatment at 3000 Volts. Table 3 provides the drilling fluid properties before and after the electrophoresis treatment.

TABLE 2

Treatment mass balance: 3000 Volts for 8 hours treatment

| Mass Balance (% vol) | Treated Drilling Fluid | Deposit |
| --- | --- | --- |
| Total | 70 | 30 |
| Solids | 54 | 46 |

TABLE 2-continued

Treatment mass balance: 3000 Volts for 8 hours treatment

| Mass Balance (% vol) | Treated Drilling Fluid | Deposit |
|---|---|---|
| Water | 52 | 48 |
| Oil | 80 | 20 |

TABLE 3

Drilling fluid properties before and after electrophoresis treatment: 3000 Volts for 8 hours treatment

| Property | Before Treatment | After Treatment |
|---|---|---|
| Density (lb/gal) | 12 | 9.1 |
| Plastic Viscosity (cP) | 28 | 7 |
| Yield Point (lb/100 ft$^2$) | 16 | 3 |
| Solids (% vol) | 23 | 13.5 |
| Water (% vol) | 18 | 10 |
| Oil (% vol) | 59 | 76.5 |
| Oil/Water Ratio | 77:23 | 88:12 |

Further tests were performed on the invert emulsion drilling fluid, where 3,000 V was applied for varying treatment times between 1 hour and 8 hours in length. Analysis of the mud properties before and after treatment has shown that the mud density can be decreased by removal of solids. If a linear trend line is drawn through the density data points (FIG. 18A), mud density decreases by approximately 0.15 ppg for every hour of treatment. After 8 hours, the mud weight decreased from 11.7 ppg to 9.1 ppg. A corresponding increase in the density of the deposit removed was also observed (FIG. 18B), although data points are variable. All deposits had a weight of 14.3-15.1 ppg, which is considerably heavier then the original mud weight.

Figure 18A:
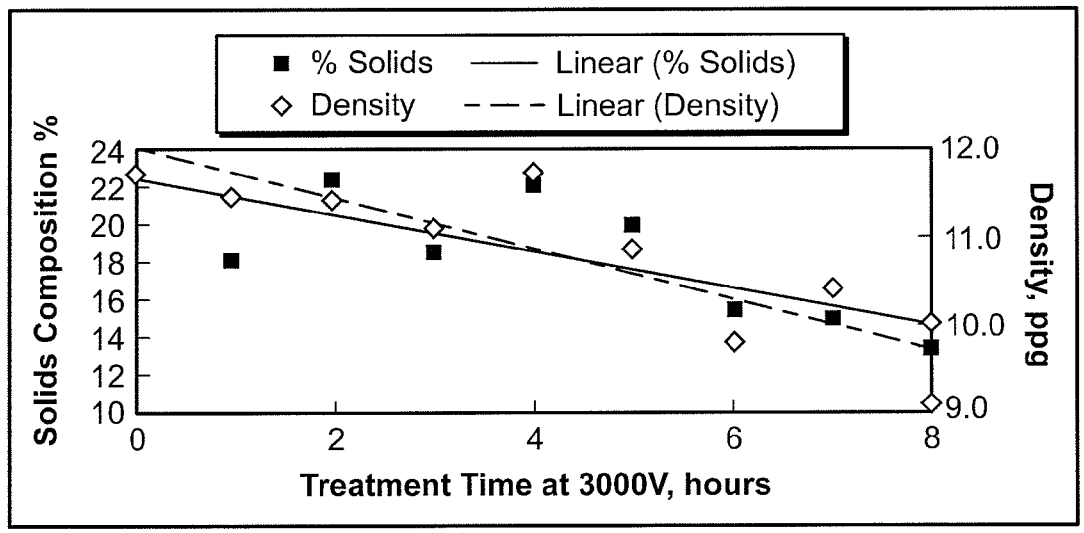
FIGS. 18A and 18B show density and solids analysis for drilling fluid and deposit after treatment with 3000 Volts in accordance with embodiments disclosed herein.
Figure 18B:
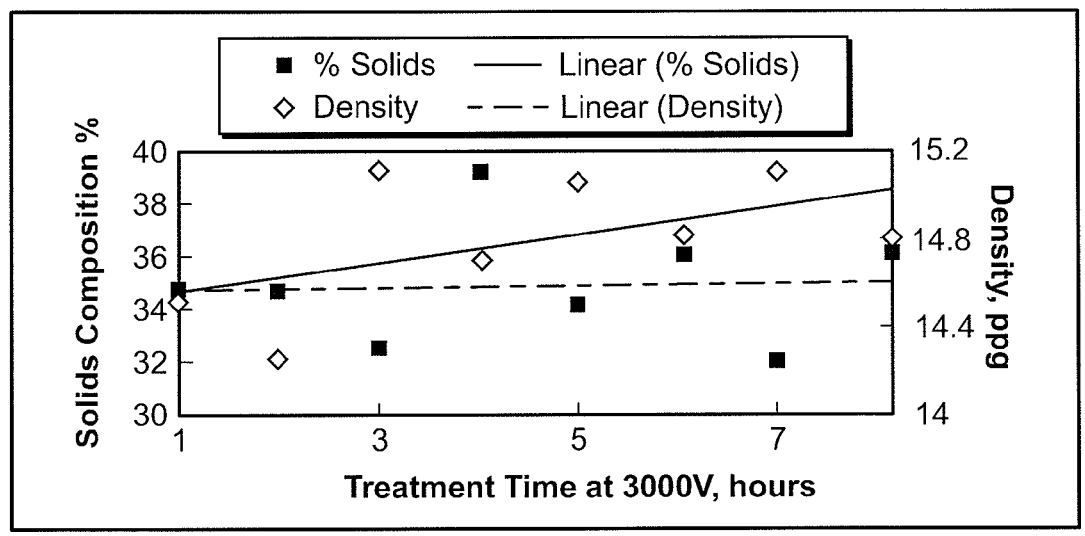

Corresponding with the decrease in weight of the drilling fluid, a decrease in the total amount of solids remaining in the mud was observed as treatment time was increased (FIG. 18A). The percentage solids in the deposits ranged from 32% to 39% (FIG. 18B), again concentrated compared to the original solids content of the mud, but no clear trend with increasing treatment time was observed, due to the variability in the data.

Figure 19A:
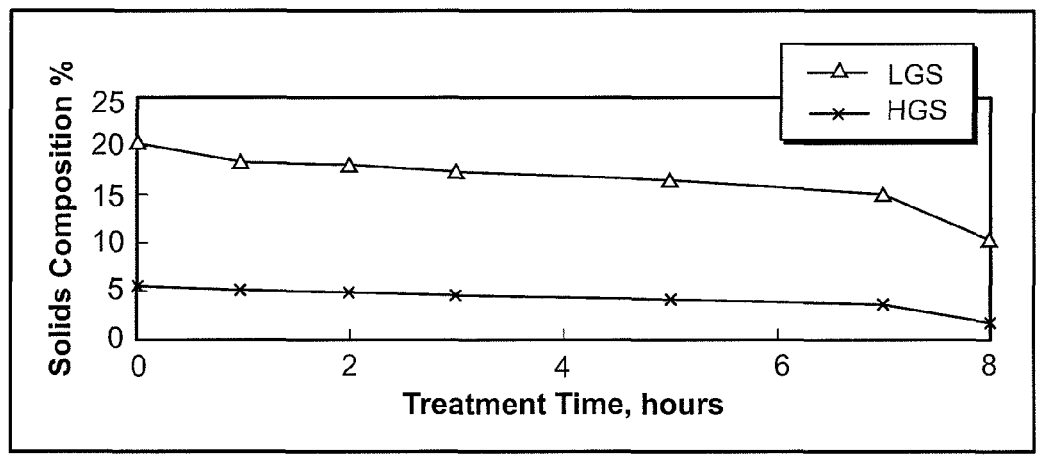
FIGS. 19A and 19B show solids composition of drilling fluid and deposit after treatment with 3000 Volts in accordance with embodiments disclosed herein.
Figure 19B:
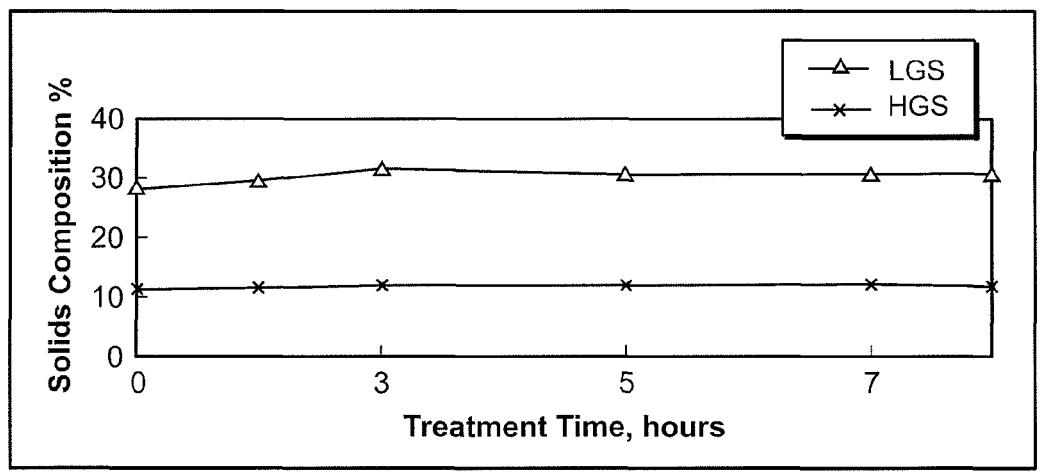

HGS and LGS concentration in the treated muds and the deposits were determined by a most stringent measures (MSM) analysis, as a more accurate method compared to the standard OBM mud check. FIG. 19A shows that as treatment time increased the percentage HGS in the treated fluid decreased from 5.5% to 1.9% after 8 hours treatment at 3000 V. The LGS content of the treated fluid was also seen to decrease as the treatment time was increased, with LGS being reduced from 20.2% to 10.5% in 8 hours. Analysis of the deposit composition by MSM (FIG. 19B) has shown fairly constant values from HGS and LGS at each time interval, each being considerably higher than that of the base mud (LGS-29% and HGS-10.5%).

Figure 20A:
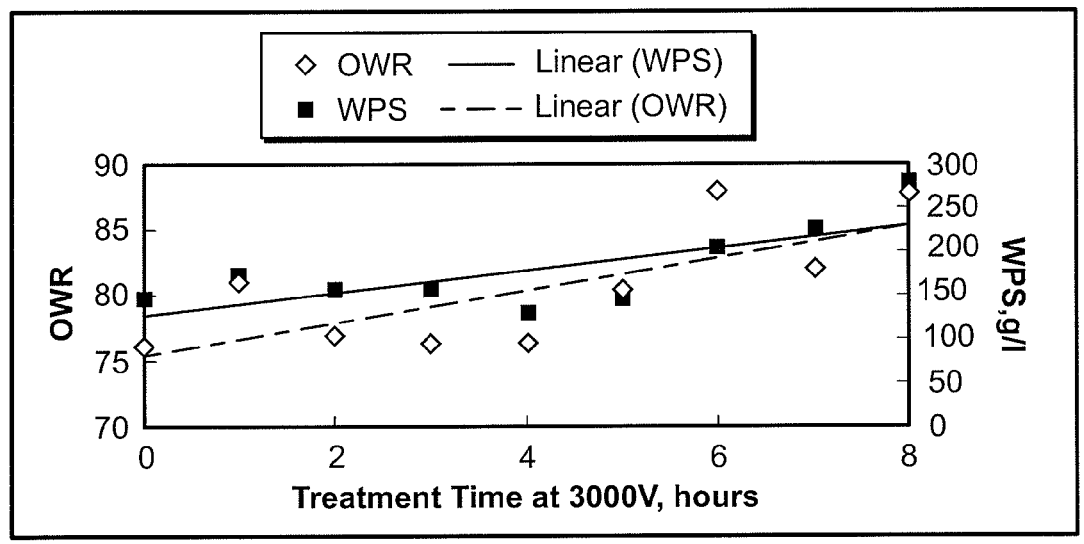
FIGS. 20A and 20B show oil water ratio and water phase salinity (WPS) of drilling fluid and deposit after treatment with 3000 Volts in accordance with embodiments disclosed herein.
Figure 20B:
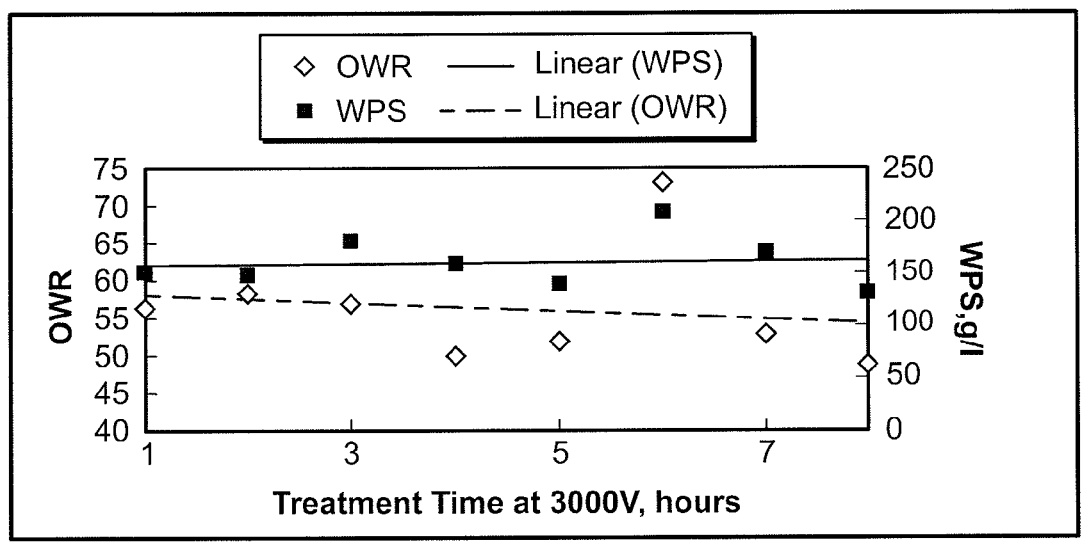

The OWR of the treated mud increases with the treatment time, as the electro-separation also removes the water fraction of the drilling fluid as part of the deposit (FIG. 20A). The starting OWR was 76:24, and an OWR of approximately 88:12 was observed as treatment time reached 6-8 hours. A slight decrease in OWR of the deposit was also detected (FIG. 20B), although again variability in the data is seen. The majority of the deposits had an OWR in the range of 48:52 to 59:41, which is much lower than that of the base mud.

Figure 21:
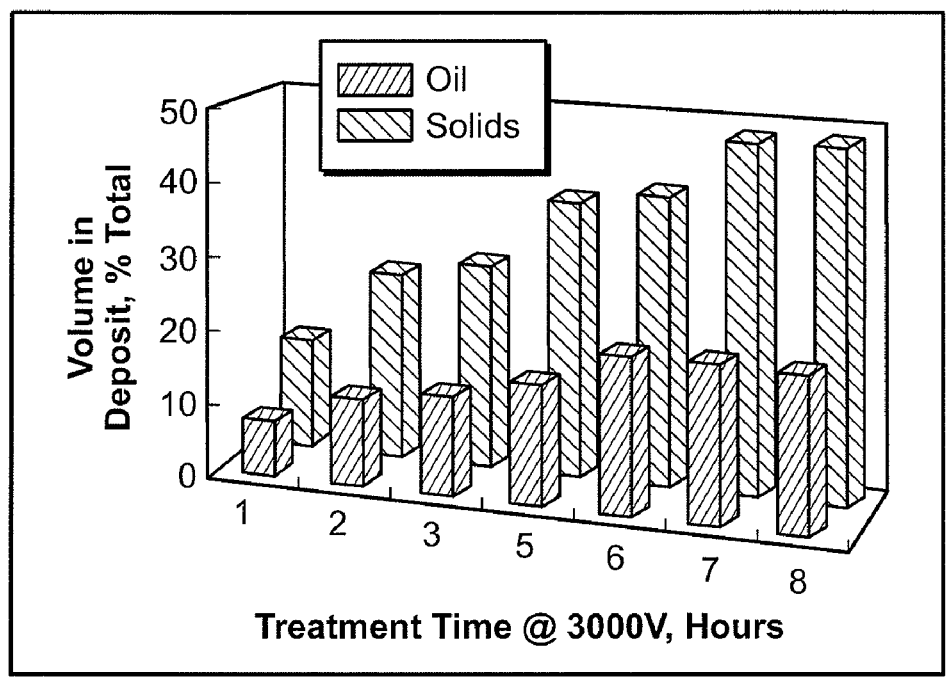
FIG. 21 shows deposit solids and oil volume balance after treatment with 3000 Volts in accordance with embodiments disclosed herein.

The deposit volume increased as the treatment time increased. All deposits showed some mud transfer and a concentration of water and solids at the electrode. No clear trend with increasing treatment time was observed in terms of the deposit composition. In terms of volume balance, the optimum treatment method results from a low oil transfer to the deposit with maximum solids transfer. FIG. 17, discussed above, shows that after 8 hours the highest volume of deposit was collected. The volume balance for oil and solids composition of the deposit over the range of treatment times is shown in FIG. 21. The deposit collected after 8 hours of treatment contained the highest proportion of the total solids, with approximately 50% of the solids in the mud being collected as the deposit. The oil content of the deposit was also fairly low, with around 14% of oil being transferred. As discussed above, the deposit collected after 8 hours static at 3000 V was much deeper (3-4 cm) and had a thick and sticky consistency.

Figure 22A:
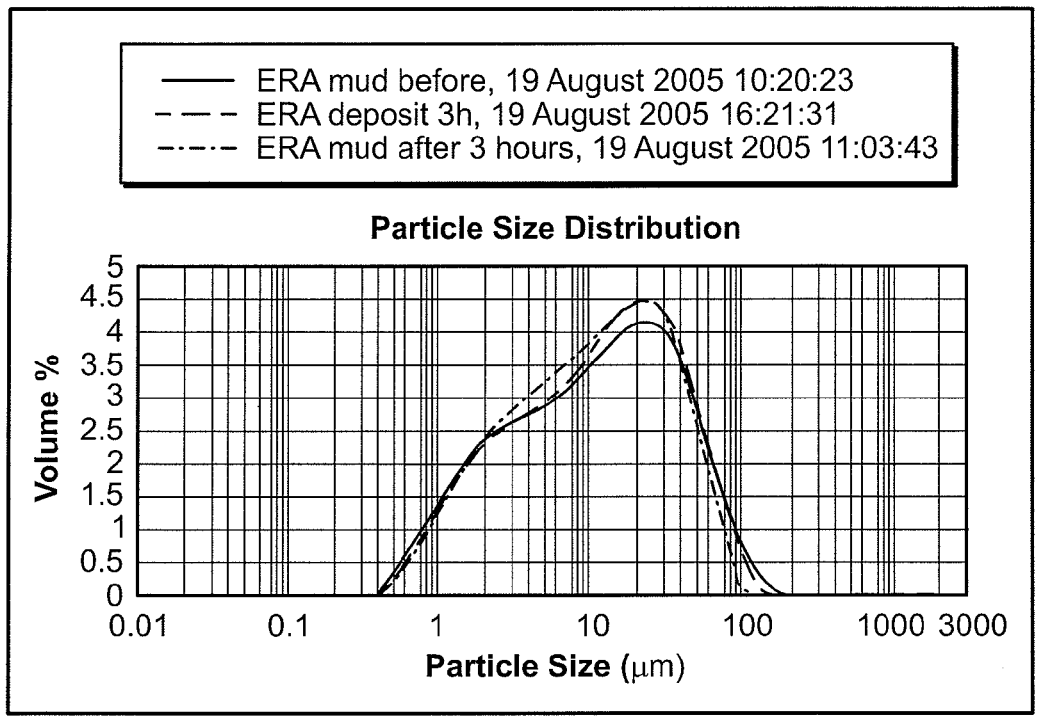
FIGS. 22A-22C show PSD traces for drilling fluids and deposits treated in accordance with embodiments disclosed herein.
Figure 22B:
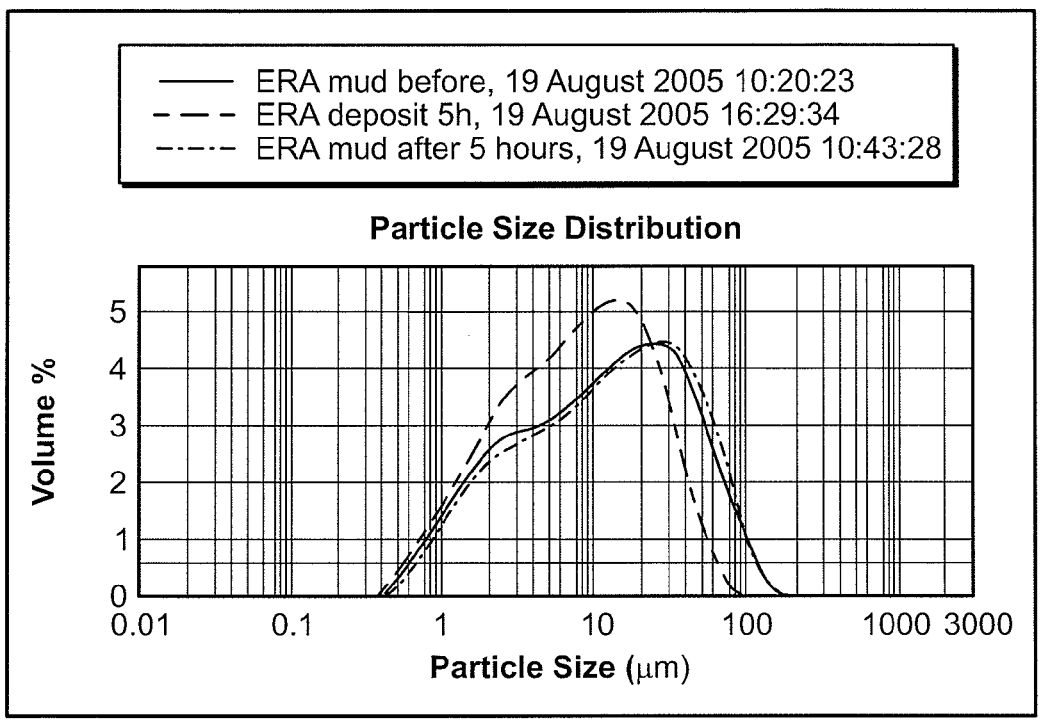
Figure 22C:
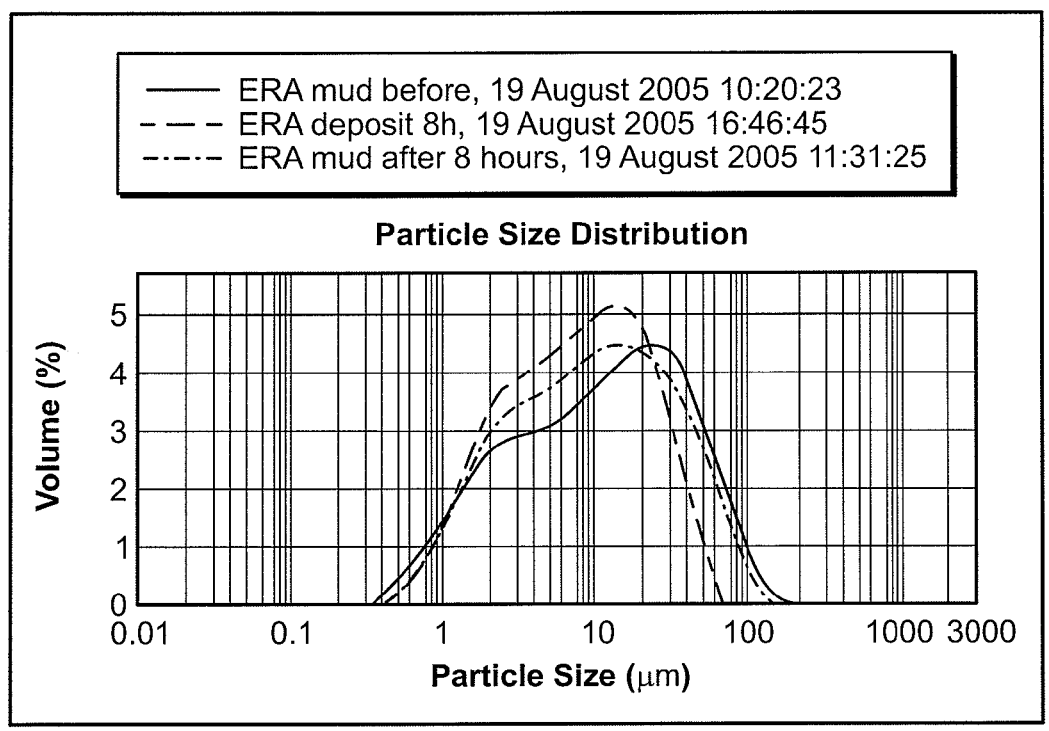

PSD analysis of the mud before and after treatment and of the deposits collected over the various treatment periods was performed. FIG. 22A shows the results from a 3 hour treatment, and it can be seen that the traces for the muds and deposit are very similar and fit well to the barite optical model. This same trend was seen with samples after 1 and 2 hour treatments. This suggests that the electrophoresis process at these time intervals is collecting both barite and LGS at equal rates. As the time period is extended to 5 hours (FIG. 22B) and 8 hours (FIG. 22C), it can be seen again that the mud samples show a similar profile, as the quantity of barite masks the contribution of LGS.

However, examination of the deposit samples show the PSD trace shifted to the left, as they contain a greater quantity of fine material. This is seen by the difference in the D90 values of the deposits compared to the mud samples (Table 4). Therefore, this suggests that as the treatment time increases, the volume of fine particles (e.g., fine barite or LGS) in the deposit increases.

TABLE 4

PSD Analysis of Muds and Deposit

| Sample | Mud Before | Mud After 3 Hr | Deposit After 3 Hr |
|---|---|---|---|
| D10 | 1.606 | 1.747 | 1.870 |
| D50 | 11.631 | 11.039 | 12.474 |
| D90 | 50.480 | 42.651 | 48.668 |

| Sample | Mud Before | Mud After 5 Hr | Deposit After 5 Hr |
|---|---|---|---|
| D10 | 1.606 | 1.646 | 1.703 |
| D50 | 11.631 | 12.661 | 8.229 |
| D90 | 50.480 | 54.392 | 29.104 |

| Sample | Mud Before | Mud After 8 Hr | Deposit After 8 Hr |
|---|---|---|---|
| D10 | 1.606 | 1.702 | 1.644 |
| D50 | 11.631 | 9.614 | 7.751 |
| D90 | 50.480 | 43.339 | 27.468 |

As MSM results have shown fairly constant values for the HGS and LGS content of the deposit, it suggests that both LGS and HGS are pulled at equivalent rates and, therefore, migration rate may be dependant on particle size rather than nature. If the emulsifier coating is charged and results in migration of the particles, the small particles may have an overall lower charge and will, therefore, migrate more slowly than the larger particles. Also, fine particles will be more prone to influences against migration due to their high surface area:volume ratio.

Figure 23A:
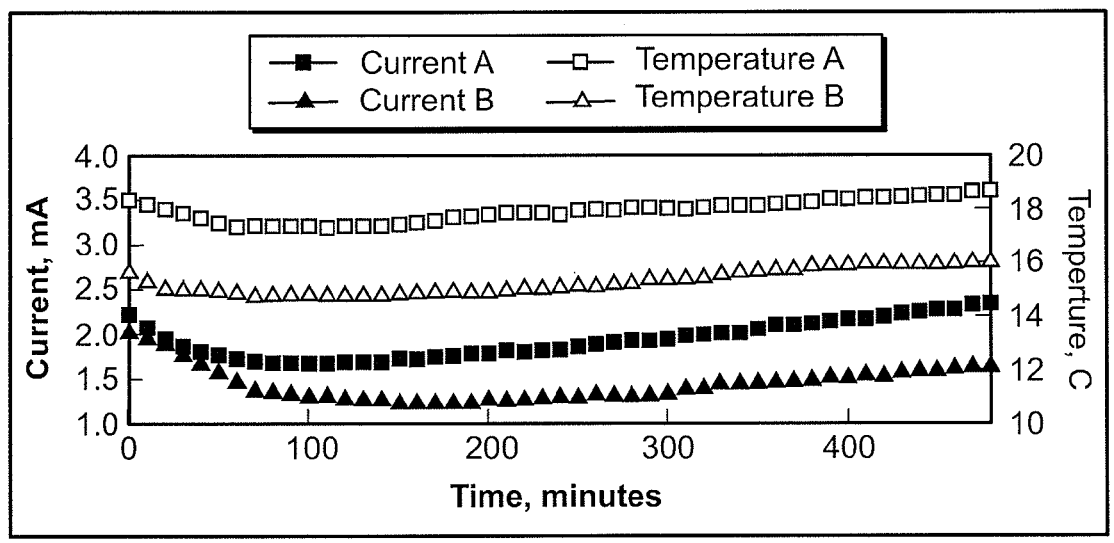
FIGS. 23A and 23B show temperature dependency of current and deposit properties at 3000 Volts in accordance with embodiments disclosed herein.
Figure 23B:
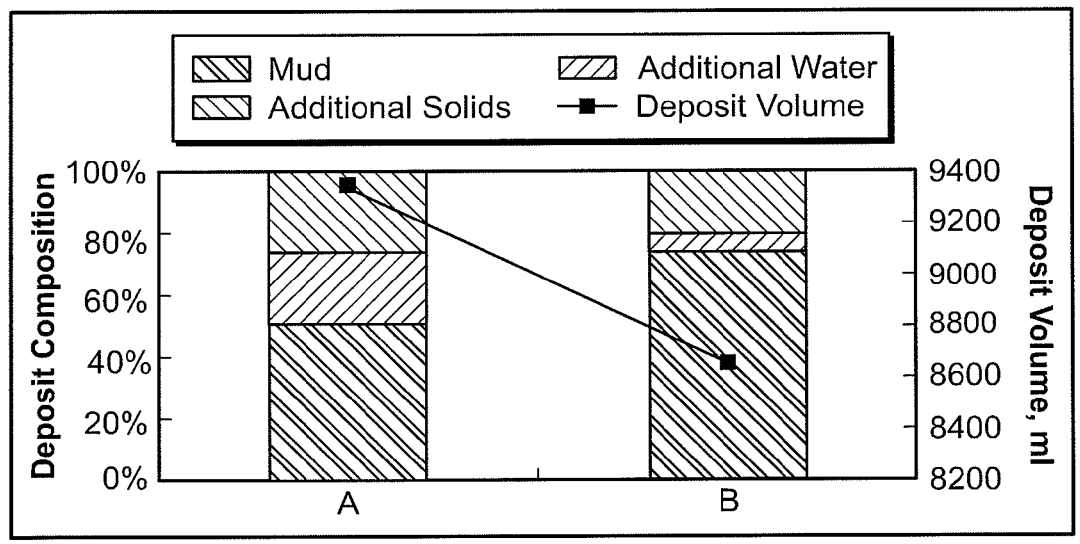

FIG. 23A shows the temperature and current profile of two tests performed at 3000 V, for 8 hours. Test A was performed at a higher temperature and exhibited a higher current throughout the test, due to a higher ambient temperature on the test day. When the properties of the deposit collected from each test were examined (FIG. 23B), it was seen that at the higher current, a larger volume of deposit was collected, with more additional solids and water, and a lower amount of mud transfer. Therefore, this shows that increasing the temperature and the resulting increasing current improved the deposit quality and makes for a more efficient process.

In order to determine the limits of the process in terms of treatment time, tests were performed where the total treatment time was 16 hours—operated as 16 hours static or as two 8 hour static tests on the same batch of mud.

Figure 24:
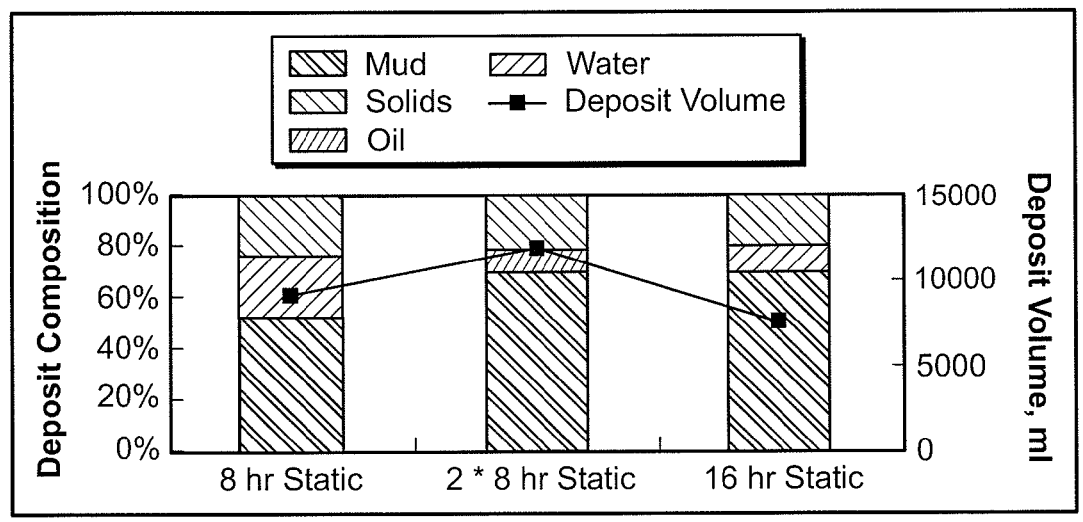
FIG. 24 shows deposit composition after treatment with 3000 Volts in accordance with embodiments disclosed herein.

FIG. 24 shows that the volume of deposit recovered after the 2 eight hour tests increased over the single eight hour treatment period, as describe earlier (see example 6). The volume of deposit recovered after 8 hours was comparable (approximately 9 liters) and extending the treatment period for another eight hours only yielded an additional 3 liters of deposit. This is likely due to the decreased mud volume in the drum, decreased contact area with the electrode, and reduced solids and water content in the mud to be treated. Treating the mud for 16 hours static, showed a lower volume of deposit, even compared to that removed after a single eight hour treatment. This is due to the deposit becoming so large that parts slumped off and could not be recovered. Also, deposit growth was restricted by the drum size.

The results of the mud before and after treatment are shown in Table 5. All treated muds showed a decrease in mud weight, an increase in OWR and a reduction in solids content.

TABLE 5

Mud Properties after Treatment at 3000 V

| | | Mud After | | |
|---|---|---|---|---|
| | Mud | 8 hours | 2 * 8 hr | 16 hours |
| Density, ppg | 11.72 | 9.1 | 11 | 7.1 |
| 600 | 69 | 17 | 63 | 5 |
| 300 | 42 | 10 | 36 | 3 |
| 200 | 33 | 6 | 28 | 2 |
| 100 | 24 | 3 | 18 | 1 |
| 6 | 10 | 1 | 7 | 0 |
| 3 | 9 | 0 | 6 | 0 |
| PV, cP | 27 | 7 | 27 | 2 |
| YP, lb/100 ft2 | 16 | 3 | 9 | 1 |
| ES, Volts | 450.67 | 691 | 732 | 1097 |
| Solids, % | 23.33 | 13.5 | 19.5 | 2.5 |
| Water, % | 19.33 | 10 | 18.5 | 2.5 |
| Oil, % | 57.33 | 76.5 | 62 | 95 |
| OWR | 75.00 | 88 | 77 | 97 |
| xs Lime, ppb | 1.78 | 1.95 | 1.3 | 5.2 |
| Wps, q/l | 146.51 | 280 | 162.16 | 640 |
| % LGS | 13.17 | 10.46 | 10.42 | 1.34 |
| % HGS | 9.22 | 1.96 | 8.06 | 0.4 |

The lab scale and pilot data presented in the examples above, have shown that variations in the drilling fluid chemistry have significant effect on the electrophoretic separation of solids and water from the fluid. Therefore, for each fluid there needs to be an optimization phase to ensure maximum performance. As the volume of deposit collected increases with voltage and time, the acceptable LOS percentage and treatment duration needs to be balanced.

Full-Scale Electrophoresis Treatment

In order to treat larger volumes of drilling fluid on a commercial scale, a full size electrophoresis unit and process is now described. The process cycle starts by filling the baths with drilling fluid to a predefined level within the baths as measured by a level sensor. Voltage is directly applied to the baths to form an electrical field that attracts the negatively or positively (depending on the drilling fluid to be treated) charged low gravity solids and entrained water in the drilling fluid to the surface of the grounded drums, which are partially submerged in the baths. After the defined treatment time, the voltage applied is terminated and the scrapers are activated to position themselves on the drums. The drums are then rotated to collect the deposit. Once the deposit is on the scrapers, the scrapers are moved to transfer the deposit from the scrapers into an auger collection system. The auger collection system moves the deposit along the auger into a suitable collection vessel. Treated drilling fluid may then be removed from the baths using a pump or other methods known in the art. In the sections below, the equipment is explained in more detail.

If alternative fluid systems are being used or if the electrophoresis unit is to sit for a period between applications, a base oil (BO) flushing system may be provided to clean the baths. The BO flushing system includes high pressure spray nozzles that spray high pressure fluid near either or both ends of the baths. The dirty oil may then be collected by filling or emptying pipe work connected to the baths.

The electrophoresis unit may include two methods of operation, manual and automatic. In the manual control option, all functions of the system are selected at the control panel by the operator. In the automatic control cycle, once the operator has input the test duration and either the voltage or the current set-point, the unit will automatically cycle through the operations, with intervention only needed to operate the mud pump.

Figure 25A:
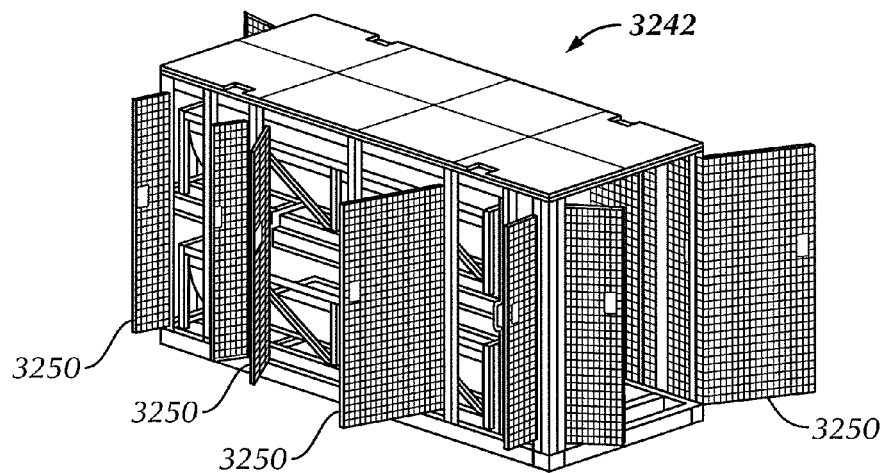
FIGS. 25A-25C show components of an electrophoresis unit in accordance with embodiments disclosed herein.
Figure 25B:
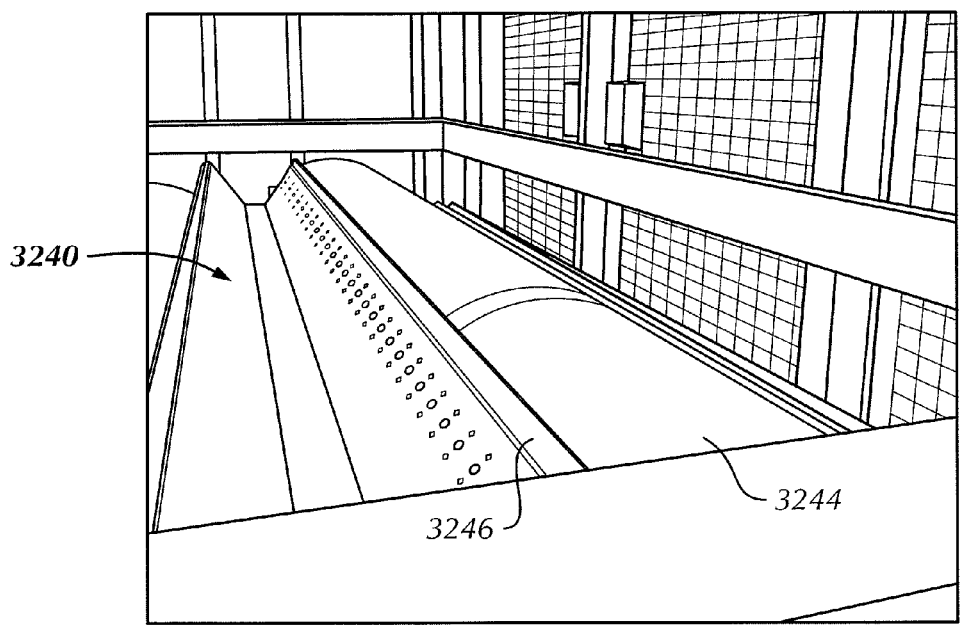
Figure 25C:
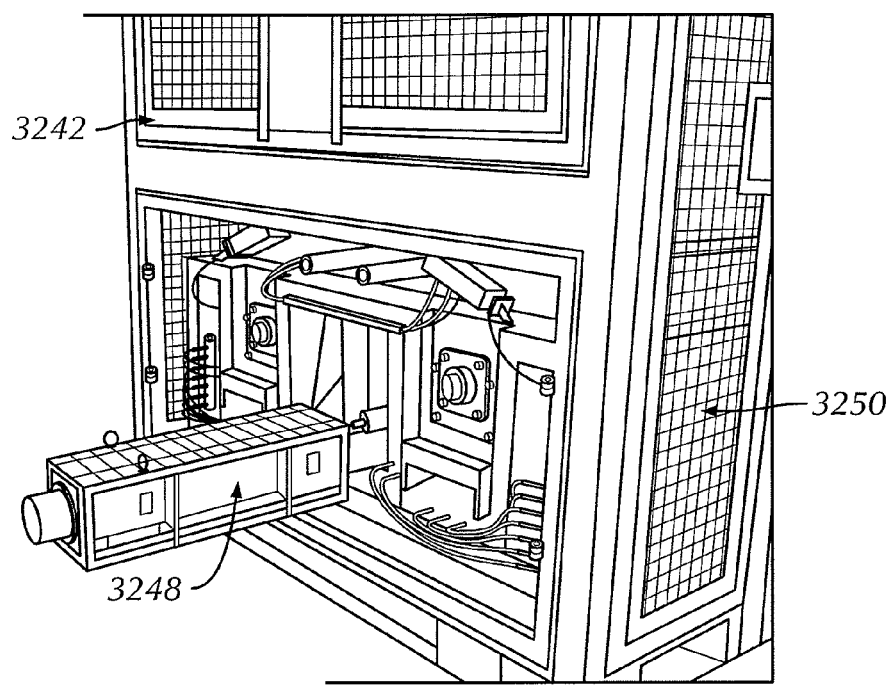

Referring now to FIGS. 25A-C, the electrophoresis unit 3240 is provided in a single self contained skid 3242, which may be easily installed at any location. The unit 3240 contains a set of baths (not independently illustrated) that hold the drilling fluid to be treated. Drums 3244 are suspended into the drilling fluid and act as the collection electrode, i.e., where the deposit collects, in much the same way as the pilot unit described above. The unit 3240 also provides the required piping and controls for fill and empty sequences, and a deposit collection and removal system. The deposit collection and removal system includes retractable scrapers 3246 to clean the collected deposit from the drum 3244, an auger 3248 to remove the deposit from the skid 3242 for disposal and an integrated bath cleaning system (not shown). In one embodiment, a programmable logic controller (PLC) system may be disposed in a control panel to control the electrophoresis and cleaning processes.

In one embodiment, skid 3242 includes a frame with multiple mesh doors 3250 at the front and sides. For example, in one embodiment, the frame includes 6 mesh doors at the front, 4 mesh doors at one side, and 2 mesh doors at the other side. The back panels may be fixed in certain embodiments, or movable (e.g., hinged) in others. The front 6 doors may be attached to bolted supports that can be removed to allow the components of the skid to be removed for repair and maintenance. The skid 3242 is configured to be transportable, and the only equipment required externally is a mud pump that is typically readily available on-site, and storage containers for base oil, mud, and deposit. In one embodiment, the deposit and or mud may be transferred to mud or solids tank available on-site.

To maximize operation, the unit 3240 may be divided into two operational sub-units—an upper unit and a lower unit. Each sub unit is disposed on an inner frame (see for example 3362 in FIG. 26) that fits within the skid 3242. The position of each unit may be interchangeable. That is, the unit from the bottom deck may be moved to the top deck, which reduces the need for additional pieces of equipment to raise the skid 3242, and may provide easier removal of the deposit from the auger 3248. In this embodiment, the inner frame (3360 in FIG. 26) supports two baths (3360 in FIG. 26) configured to contain a drilling fluid to be treated. Suspended into each bath is a drum 3244 that acts as the collecting electrode for the deposit. A retractable scraper configuration 3246 is disposed on each drum 3244 to remove the deposit from the drum 3244. An auger 3248 may be disposed between each pair of drums 3244 to remove the deposit collected by the scraper 3246 from the skid 3242.

The design of the baths and drums may be selected based on the volume of drilling fluid to be treated and the size and operational constraints of a particular location of use. The baths are provided to contain the drilling fluid to be treated and also act as the outer electrode that is charged using the high voltage power supply to repel the charged particles. A drum may then be suspended in each bath and acts as the inner electrode to attract the charged particles. The distance between the drum 3244 and an inner surface the bath (not shown) may be selected so as to maximize the electric field generated between the drum 3244 and the bath.

Figure 26:
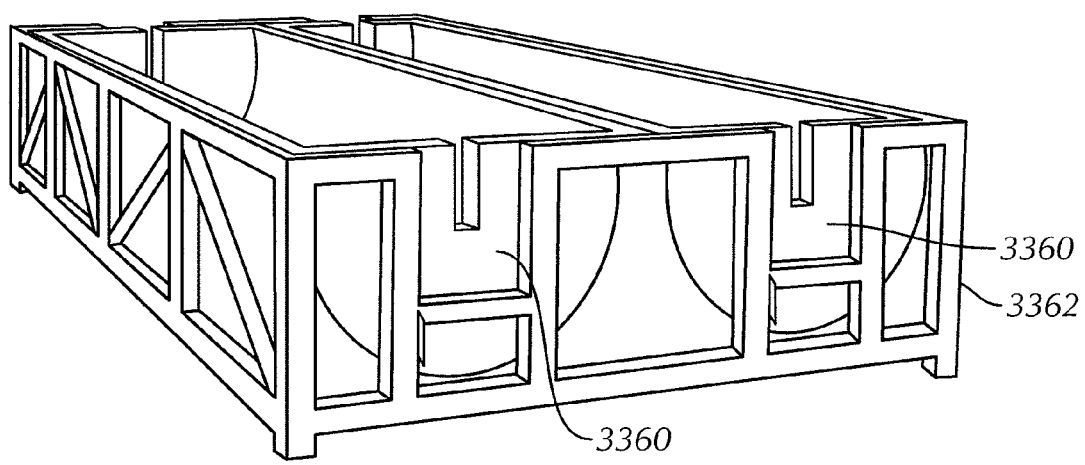
FIG. 26 shows baths disposed in an inner frame of an electrophoresis unit in accordance with embodiments disclosed herein.
Figure 27:
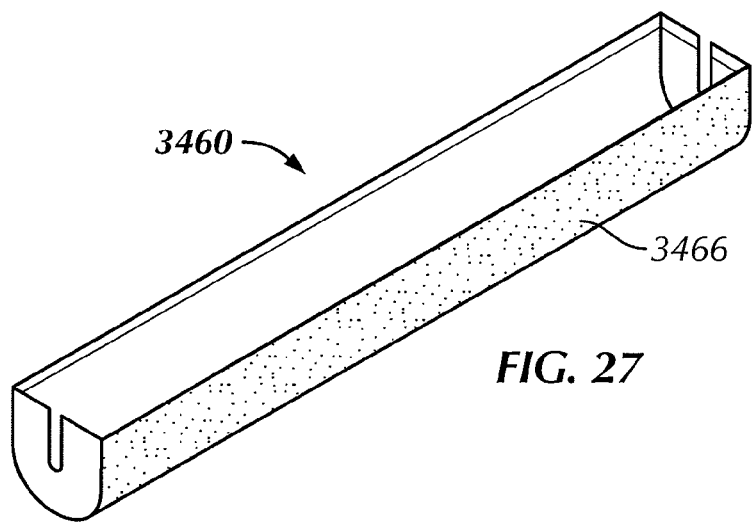
FIG. 27 shows a bath with a coating for an electrophoresis unit in accordance with embodiments disclosed herein.

As shown in FIG. 26, in one embodiment, the baths 3360 may be disposed in an inner frame 3362. Baths 3360 may be formed from, for example, stainless steel. Baths 3360 include bath end plates (not independently illustrated) that are made from an insulating plastic and contain the nozzles for a base oil flush system (discussed in more detail below). Without the correct insulating materials, the process will continuously ground or arc, and therefore, not operate. Thus, using materials that can sufficiently insulate the electrophoresis system is important. The baths 3360 may be coated with an insulating material, for example, Polymer Performance Alloy (PPA) 571 by Plascoat (Farnham, UK), which is based on an alloy of acid modified polyolefins. The coating may be applied using a spraying technique to provide a predetermined insulation layer, based on the necessary resistance required for a given electrophoresis unit. For example, a coating of approximately 350 μm will provide $8\times10^{17}\Omega$ surface resistivity. As shown in FIG. 27, an additional layer of polyurethane 3466 may also be added to provide insulation between the baths 3460 and the skid (not shown). The layer of polyurethane is constructed in such a way that it acts as a liner on the outside of the baths 3460.

Figure 28:
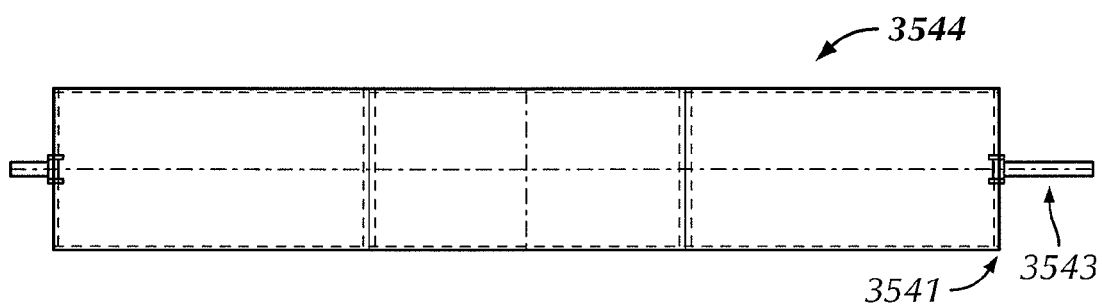
FIG. 28 shows a cross-sectional view of a drum of an electrophoresis unit in accordance with embodiments disclosed herein.

As shown in FIG. 28, a drum 3544 may be cylindrical and hollow. In one embodiment, the drum 3544 may be formed of stainless steel sheeting. Each drum 3544 includes insulated end plates 3541 and a shaft 3543. The shaft 3543 is configured to directly connect to a motor that rotates the drum 3544. One of ordinary skill in the art will appreciate that any motor known in the art may be used to drive the drum 3544. In one embodiment, the drum 3544 may be connected to a 1.1 kW motor that moves the drum 3544 at approximately 5 RPM.

Figure 29A:
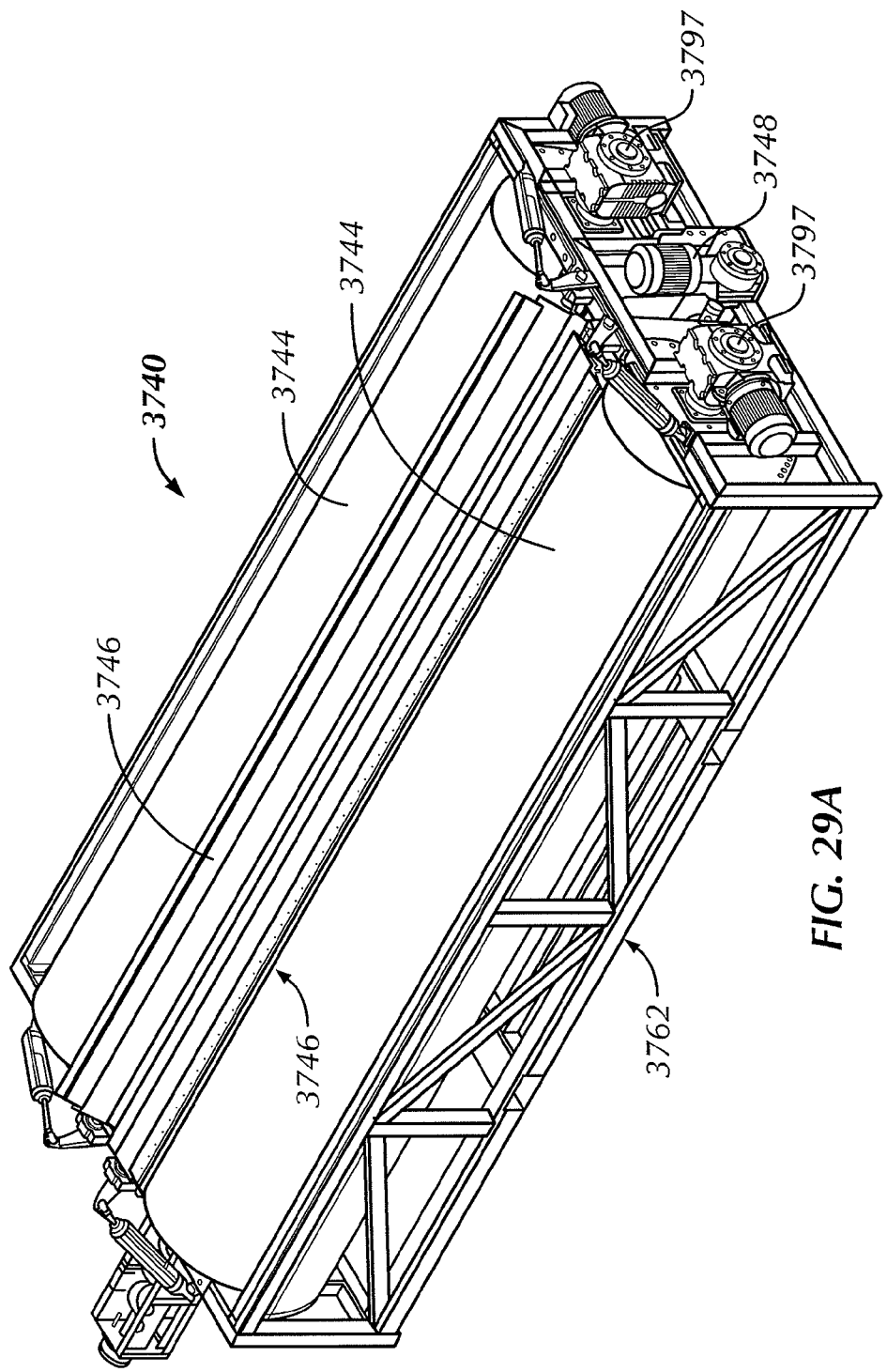
FIGS. 29A and 29B show a perspective view and an end view, respectively, of an assembled electrophoresis unit in accordance with embodiments disclosed herein.
Figure 29B:
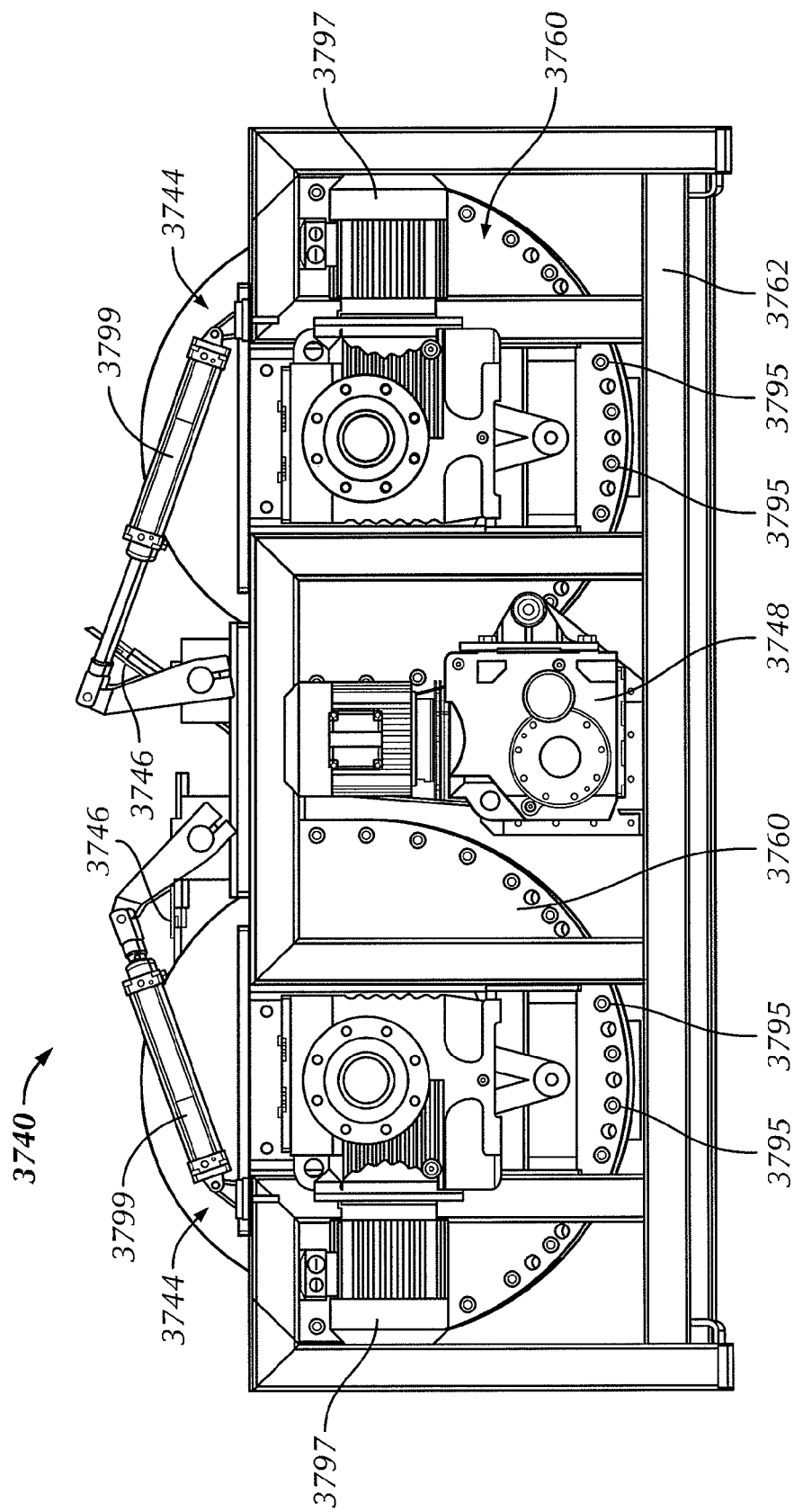

FIGS. 29A and 29B are schematics of a portion of an assembled electrophoresis unit 3740. The electrophoresis unit 3760 includes two assembled electrophoresis baths 3760 disposed in an inner frame 3762. A drum 3744 configured to rotate is disposed within each bath 3760. A motor 3797 may be coupled to each drum 3744 to rotate the drum 3744. Alternatively, a single motor may drive both drums 3744 disposed in the inner frame 3762. A scraper device 3746 is assembled to each bath 3762 and configured to retractably contact the rotating drum 3744. An actuator 3799 may be assembled to the bath 3760 and configured to move the scraper device 3746 into contact with the drum and/or move the scraper device 3746 away from the drum 3744. In one embodiment, the actuators 3799 may be, for example, pneumatically or hydraulically actuated to move the scraper device 3746 into contact with the drum 3744. One of ordinary skill in the art will appreciate that any actuation means known in the art may be used without departing from the scope of embodiments disclosed herein. Once the deposit is on the scraper device 3746, the scrapers are moved to transfer the deposit from the scrapers into an auger collection system 3748. The auger collection system 3748 moves the deposit along the auger into a suitable collection vessel (not shown). As discussed above, a base oil (BO) flushing system may be provided to clean the baths. The BO flushing system includes high pressure spray nozzles 3795 that spray high pressure fluid near either or both ends of the baths 3760. The dirty oil may then be collected by filling or emptying pipe work connected to the baths.

Referring back to FIGS. 25A-C, the electrophoresis unit 3240 may also include a safety system to protect an operator and other personnel from injury. In one embodiment, the safety system must be activated before power will be provided to the components of the unit 3240. In one embodiment, the safety system includes interlocks fitted on each of the doors of the skid 3242, thereby electrically interlocking the power supply to the unit to the main power supply so that all electrical power is isolated when the enclosure doors are opened. To energize the interlocks on the doors, a control panel may allow an operator to 'close' or 'lock' each door by moving a switch into the selected 'close' position. In this embodiment, to activate the safety system, all of the interlocks must be energized, i.e., all of the switches must be moved to the 'close' position on the control panel. If there is an interruption in the system, and emergency stop or reset light may illuminate or sound to indicate that there is an issue and prevent the system from being activated. One of ordinary skill in the art will appreciate that any interlock and/or selector switches known in the art may be used without departing from the scope of embodiments disclosed herein.

To fill the baths (3360 in FIG. 26), the electrophoresis unit may include a filling system that includes a mud pump fluidly connected to an inlet/outlet valve on the skid (3242 in FIG. 25). Each bath may be fluidly connected to a valve that controls the flow of drilling fluid into each bath. In one embodiment, these bath valves may be pneumatically actuated. The control panel for the electrophoresis unit may include selector switches for operating and controlling the valves of the filling system. Thus, in one embodiment, an operator may select 'start' on the auto selector switch on the control panel and start the mud pump. The system will then automatically open 3 pneumatically controlled valves: a main inlet valve, a bath 1 valve, and a bath 2 valve. One of ordinary skill in the art will appreciate that more or less valves may be operated depending on, for example, the size of the skid and the number of baths.

Once the baths have reached a predefined level, level sensors disposed in each bath (1 per bath) send a signal to the control system. The level sensors may be, for example, ultrasonic switch sensors programmed for minimum and maximum acceptable levels of fluid within the bath. A light that indicates that the baths are 'full/ready' will illuminate and switch the auto selector switch to 'stop'. In this embodiment, all the valves will automatically close and set off a visual and audio alarm. This will alert the operator to stop pumping. If the mud pump is controlled by the control system, the pump will automatically be stopped. One of ordinary skill in the art will appreciate that other control systems and methods for monitoring and operating the system may be used without departing from the scope of embodiments disclosed herein. For example, in certain embodiments, some of the operations may be manually controlled or automated.

Voltage may be applied directly to the baths. In addition to the unit's safety system, the baths must have fluid in them between the minimum and maximum levels for high voltage (HV) operation. If the fluid is present, the designed voltage or current and treatment duration may be set. A HV unit can then be turned on. Once the HV unit has run its set duration, it will automatically switch itself off. The HV unit may be any HV unit known in the art to provide a determined voltage to the bath, for example, a Pegasus Range HV power supply by Genvolt (Bridgnorth, UK). In one embodiment, the HV unit may be modified to include a separate timer that controls the duration of the test.

The voltage applied may be selected based on drilling fluid properties, e.g., types of contaminants, volume of fluid, OWR, etc. In some embodiments, the voltage applied may be in a range of about 440 V to about 5,000 V. In other embodiments, the voltage applied may be in a range of about 500 V to about 3,000 V. Further, certain countries of operation provide voltage regulations for such processes. For example, Low Voltage Directive 73/23/EEC regulates voltage use and sets a maximum limit. In these instances, the voltage applied may be selected based on the corresponding regulations. Therefore, in certain embodiments resistors may be installed to ensure a maximum voltage supplied by HV unit. For example, the voltage applied may be limited to approximately 900 V.

Once the HV unit completes its preset cycle (i.e., after voltage is applied for a pre-determined time interval) and switches off, an auger or screw conveyor is started. In certain embodiments, the auger conveyor may be disposed proximate one or more scraper blades configured to remove deposit from a rotating drum. In alternate embodiments, where two baths are used, the auger conveyor may be disposed between the two baths and their corresponding scraper blades. The auger conveyor may be started by selecting a 'start' on a conveyor selector switch on the control panel. One or more scraper blades may then be applied to the drums by selecting 'open' on the corresponding scraper selector switch on the control panel. Rotation of the drums may be started by selecting 'on' on the corresponding drum selector switch on the control panel. As the scraper blades contact the rotating drum, the deposit collected on the drum during the HV process will flow from the drums onto the scrapers.

In one embodiment, a scraper assembly consists of a blade and an adapter configured to hold the blade. The scraper blades generally extend the entire length of the drums. The blade may be formed from a composite material, a plastic material, an elastomeric material, or any combination thereof. The adapter may be formed from, for example, steel, alloys, or plastics. The scraper assembly is mounted onto the inner frame of the electrophoresis unit and includes a double acting air piston at each end. The blade adapter is connected to the piston to allow the blade to be raised or lowered onto the drum using air from a compressor. As discussed above, this movement of the scraper blades may be controlled from the control panel.

Once a predetermined amount of deposit has been collected on the scraper blades or after voltage has been applied to the bath for a pre-determined time interval (this will vary depending on fluid system, treatment time, and voltage applied), the scrapers may be moved or flipped by selecting 'off' on the corresponding scraper and drum selector switches, thereby allowing the deposit to fall into the auger. A motor is connected to the auger conveyor to rotate the auger, thereby moving the deposit down along the auger, and along an auger extension outside the skid to a collection vessel. A magnetic identification tab may be disposed on the collection vessel, such that the auger will only operate when a vessel is disposed proximate a discharge end of the auger extension. While embodiments disclosed herein include controlling various components of the electrophoresis unit and system from a control panel, one of ordinary skill in the art will appreciate that one or more components may be actuated or operated manually without departing from the scope of embodiments disclosed herein.

Figure 30:
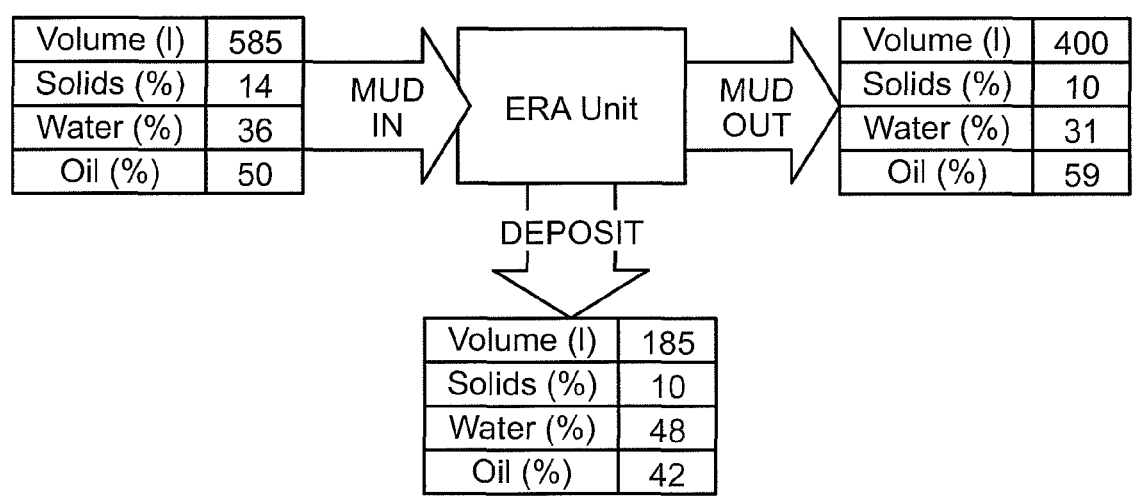
FIG. 30 is a flow diagram of treatment of an invert emulsion drilling fluid using a full scale treatment unit in accordance with embodiments disclosed herein.

A test using a full-scale electrophoresis unit was conducted using fluid containing 14% total solids. This fluid was treated for 8 hours at 900 volts. FIG. 30 shows that the total solid content was reduced from 14 to 10%. A corresponding reduction in mud weight from 11 lb/gal to 10.3 lb/gal was measured. Removal of the brine phase increased the oil/water ratio from 58:42 to 66:34. During the process, 32% of the original fluid volume was lost with the deposit, but 81% of the valuable oil component was retained in the processed drilling fluid.

Advantageously, embodiments disclosed herein provide a method for removing solids and water from an oil based drilling fluid. The resulting treated fluid recovered from the process advantageously may have a lower density, lower solids content, lower viscosity, and/or higher oil to water ratio as compared to the feed mud or drilling fluid. This reduces the excessive dilution that can be associated with reconditioning drilling fluids and effectively extends the drilling fluid's useful life. The waste disposal volumes and associated costs are also reduced. Additionally, embodiments disclosed herein provide a method for removing solids and water from an oil based drilling fluid that allows the solids and water to be collected on either the positive or negative electrode of an electrophoresis unit and by repulsion or attraction mechanisms.

Furthermore, embodiments disclosed herein advantageously provide a method and apparatus for removing solids from a drilling fluid, including the LGS that traditional solids control equipment on rigs cannot separate. The system disclosed herein requires low energy consumption due to the small conductivity of the invert emulsions and does not require expensive chemical additives. Methods and apparatus disclosed herein may also reduce the concentrations of solids (including LGS) and water in a drilling fluid, resulting in improved properties of drilling operations, such as increasing the drilling rate and reducing the non-productive time. Advantageously, embodiments disclosed herein may reduce cost, energy consumption, disposal volume and storage pressure, and increase the drilling fluid life span allowing re-use, with valuable components recycled.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:
1. A method of treating an invert emulsion drilling fluid comprising:
   pumping the drilling fluid to an electrophoresis unit including a positively charged electrode and a negatively charged electrode;

applying a voltage above 900 V and less than 5000 V across the two electrodes;

depositing water and solids on the negatively charged electrode; and removing deposited solids and water from the negatively charged electrode.

2. The method of claim 1, further comprising rotating a drum, wherein the drum acts as the negatively charged electrode.

3. The method of claim 1, wherein the voltage is applied for a pre-determined time interval.

4. The method of claim 3, wherein the removing of deposited solids and water is performed after the pre-determined time interval.

5. The method of claim 3, wherein the removing of deposited solids and water is performed during the pre-determined time interval.

6. The method of claim 2, wherein the removing deposited solids and water comprises providing a scraper device in contact with the rotating drum.

7. The method of claim 6, further comprising recovering deposited solids and water removed by the scraper device.

8. The method of claim 7, wherein the recovering comprises conveying the deposited solids and water removed by the scraper device out of the electrophoresis unit with an auger device.

9. The method of claim 1, further comprising electrically interlocking a power supply to the electrophoresis unit to a main power supply.

10. The method of claim 1, wherein the pumping comprises filling the electrophoresis unit to a predetermined level in a range between a minimum fill level and a maximum fill level.

11. The method of claim 1, further comprising providing a control panel and controlling at least one function of the electrophoresis unit from at least one switch on the control panel.

12. The method of claim 1, further comprising recovering the treated invert emulsion drilling fluid.

13. The method of claim 1, wherein the voltage applied ranges from 900 V to 3000 V.

14. A method of treating an invert emulsion drilling fluid comprising:

pumping the drilling fluid to an electrophoresis unit including a positively charged electrode and a negatively charged electrode;

applying a voltage above 900 V and less than 5000 V across the two electrodes;

depositing water and solids on the positively charged electrode; and removing deposited solids and water from the positively charged electrode.

\* \* \* \* \*